United States Patent [19]
Nessett et al.

[11] Patent Number: 6,055,236
[45] Date of Patent: Apr. 25, 2000

[54] METHOD AND SYSTEM FOR LOCATING NETWORK SERVICES WITH DISTRIBUTED NETWORK ADDRESS TRANSLATION

[75] Inventors: Danny M. Nessett, Fremont, Calif.; David Grabelsky, Skokie, Ill.; Michael S. Borella, Naperville, Ill.; Ikhlaq S. Sidhu, Vernon Hills, Ill.

[73] Assignee: 3Com Corporation, Santa Clara, Calif.

[21] Appl. No.: 09/271,025

[22] Filed: Mar. 17, 1999

Related U.S. Application Data

[63] Continuation-in-part of application No. 09/035,600, Mar. 5, 1998.

[51] Int. Cl.[7] .................................................. H04L 12/50
[52] U.S. Cl. .......................... 370/389; 709/245; 713/200; 370/401
[58] Field of Search ..................... 370/389, 401, 370/400, 405, 475, 392; 709/245; 713/200, 201

[56] References Cited

U.S. PATENT DOCUMENTS

| 5,159,592 | 10/1992 | Perkins ..................................... 370/85.7 |
| 5,227,778 | 7/1993 | Vacon et al. ........................ 340/825.52 |
| 5,550,984 | 8/1996 | Gelb ..................................... 395/200.17 |
| 5,636,216 | 6/1997 | Fox et al. ................................. 370/402 |
| 5,708,655 | 1/1998 | Toth et al. ............................... 370/313 |
| 5,793,763 | 8/1998 | Mayes et al. ............................. 370/389 |
| 5,812,819 | 9/1998 | Rodwin et al. ........................... 395/500 |
| 5,867,660 | 2/1999 | Schmidt et al. .................... 395/200.57 |
| 5,872,847 | 2/1999 | Boyle et al. ................................ 380/25 |

OTHER PUBLICATIONS

G. Montene, Internet Engineering Task Force, Internet Draft, "Negotiated Address Reuse" (NAR), <draft–montenegro–aatn–nar–00.txt>, May 1998, pp. 1 to 22.

George Tsirtis, Alan O'Neil, Internet Engineering Task Force, Internet Draft, "NAT Bypass for End 2 End 'Sensitive 'Applications," <draft–tsirtsis–nat–bypass–00.txt>, Jan. 1998, pp. 1 to 5.

(List continued on next page.)

*Primary Examiner*—Chau Nguyen
*Assistant Examiner*—Forood Boortalary
*Attorney, Agent, or Firm*—McDonnell Boehnen Hulbert & Berghoff; Stephen Lesavich

[57] ABSTRACT

Methods and system for locating network services with distributed network address translation. Digital certificates are created that allow an external network device on an external network, such as the Internet, to request a service from an internal network device on an internal distributed network address translation network, such as a stub local area network. The digital certificates include information obtained with a Port Allocation Protocol used for distributed network address translation. The digital certificates are published on the internal network so they are accessible to external network devices. An external network device retrieves a digital certificate, extracts appropriate information, and sends a service request packet to an internal network device on an internal distributed network address translation network. The external network device is able to locate and request a service from an internal network device. An external network device can also request a security service, such as an Internet Protocol security ("IPsec") service from an internal network device. The external network device and the internal network device can establish a security service (e.g., Internet Key Exchange protocol service). The internal network device and external network device can then establish a Security Association using Security Parameter Indexes ("SPI") obtained using a distributed network address translation protocol. External network devices can request services, and security services on internal network devices on an internal distribute network address translation network that were previously unknown and unavailable to the external network devices.

29 Claims, 25 Drawing Sheets

OTHER PUBLICATIONS

George Tsirtis, Pyda Srishuresh, Internet Engineering Task Force, Internet Draft, "Network Address Translation—Protocol Translation" (NAT–PT), <draft–ietf–ngtrans–natpt–04.txt>, Jan. 1999, pp. 1 to 13.

Jeffrey Lo, K, Taniguchi, Internet Engineering Task Force, Internet Draft, "IP Host Network Address (and port) Translation," <draft–ietf–nat–hnat–00.txt>, Nov. 1998, pp. 1 to 13.

Michael Borella, David Grabelsky, Ikhlaq Sidhu, Brian Petry, Internet Engineering Task Force, Internet Draft, "Distributed Network Address Translation," <draft–borella–aatn–dnat–01.txt>, Oct. 1998, pp. 1 to 21.

P. Srisuresh, G. Tsirsis, P. Akkiraju, A. Heffenan, Internet Engineering Task Force, Internet Draft, "DNS Extensions to Network Address Translators" (DNS_ALG), <draft–ietf–nat–dns–01.txt>, Oct. 1998, pp. 1 to 24.

P. Srisuresh, Internet Engineering Task Force, Internet Draft "Security for IP Network Address Translator (NAT) Domains," <draft–ietf–nat–security–00.txt.>, Nov. 1998, pp. 1 to 11.

P. Srisuresh, K. Eg, Internet Engineering Task Force, Internet Draft, "The IP Network Address Translator" (NAT), <draft–rfced–info–srisuresh–05.txt>, Feb. 1998, pp. 1 to 24.

P. Srisuresh, K. Egev, Internet Engineering Task Force, Internet Draft, "Traditional IP Network Address Translator (Traditional NAT)," <draft–letf–nat–traditional–01.txt>, Oct. 1998, pp. 1 to 17.

P. Srisuresh, Matt Holdrege, Internet Engineering Task Force, Internet Draft, "IP Network Address Translator (NAT) Terminology and Consideration," <draft–ietf–nat–terminology–01.txt>, Oct. 1998, pp. 1 to 28.

Praveen Akkiraju, Yakov Rekhter, Internet Engineering Task Force, Internet Draft, "A Multihoming Solution Using NATs" <draft–akkiraju–nat–multihoming–00.txt>, Nov. 1998, pp. 1 to 32.

R. G. Moskowitz, Internet Engineering Task Force, Internet Draft, "Network Address Translation Issues with IPsec," <draft–moskowitz–net66–vpn–00.txt>, Feb. 5, 1998, pp. 1 to 8.

R. Thay, N. Doraswa and R. Gle, Internet Engineering Task Force, Internet Draft "IP Security," <drat–ietf–ipsec–doc–roadmap–02.txt.>, Nov. 1997, pp. 1 to 12.

T. Hain, Internet Engineering Task Force, Internet Draft, "Architectural implications of NAT," <draft–iab–nat–implications–02.txt>, Oct. 1998, pp. 1 to 14.

W.T. Teo, S.W. Yeeow, R. Singh, Internet Engineering Task Force, Internet Draft, "IP Relocation Through Twice Network Address Translator," <draft–ietf–nat–mat–00.txt>, Feb. 1999, pp. 1 to 20.

W.T. Teo, S.W. Yeow, R. Singh, Internet Engineering Task Force, Internet Draft, "Reverse Twice Network Address Translators" (RAT) <draft–teo–yeow–mip–rat–01.txt>, Dec. 1998, pp. 1 to 20.

W.T. Teo, Y. Li, Internet Engineering Task Force, Internet Draft, "Mobile IP Extension for Private Internets Support," <draft–teoyli–mobileip–mvpn–02.txt>, Feb. 1999, pp. 1 to 24.

Yakov Rekhter, Internet Engineering Task Force, Internet Draft, "Implications of NATs on the TCP/IP Architecture," <draft–ietf–nat–arch–implications–00.txt>, Feb. 1999, pp. 1 to 7.

K. Egevang and P. Francis, "The IP Network Address Translator (NAT)", RFC 1631, www.faqs.org/rfcs/rfc1631.html, May 1994, pp. 1 to 8.

PAP REQUEST MESSAGE LAYOUT

PAP RESPONSE MESSAGE LAYOUT

PAP INVALIDATE MESSAGE LAYOUT

PAP SECURITY REQUEST MESSAGE LAYOUT

PAP SECURITY RESPONSE MESSAGE LAYOUT

PAP SECURITY INVALIDATE MESSAGE LAYOUT

114 COMBINATION NETWORK ADDRESS 116

| EXTERNAL NETWORK ADDRESS (E.G., EXTERNAL IP ADDRESS) | LOCALLY UNIQUE PORT |
|---|---|
| 198.10.20.30 | 1032 |

| INTERNAL NETWORK ADDRESS (120) | LOWEST PORT (122) | NUMBER OF PORTS (124) | |
|---|---|---|---|
| 10.0.0.1 | 1027 | 32 | 126 |
| 10.0.0.3 | 1058 | 16 | 128 |

PORT-TO-INTERNAL-NETWORK
ADDRESS TABLE

FIG. 11
SOURCE PORT TRANSLATION TABLE (SPTT)

| DEFAULT PORT | TRANSLATED PORT |
|---|---|
| PROTOCOL | TIMESTAMP |

FIG. 12
IP ADDRESS TRANSLATION TABLE (IPATT)

| DESTINATION PORT | INTERNAL DESTINATION IP ADDRESS |
|---|---|
| PROTOCOL | TIMESTAMP |

FIG. 15

IP HEADER FORMAT

| VER 202 | IHL 204 | TOS 206 | TOTAL LENGTH 208 |
|---|---|---|---|
| IDENTIFICATION 210 | | | FRAGMENT OFFSET 212 |
| TIME-TO-LIVE 214 | PROTOCOL 216 | | HEADER CHECKSUM 218 |
| SOURCE ADDRESS 220 | | | |
| DESTINATION ADDRESS 222 | | | |
| OPTIONS 224 | | | |

FIG. 21

| INTERNAL NETWORK ADDRESS ← 294 → | LOWEST SPI ← 296 → | NUMBER OF SPIs ← 298 → |
|---|---|---|
| 10.0.0.1 | 280 | 32 |
| 10.0.0.3 | 312 | 16 |

SPI-TO-INTERNAL-NETWORK ADDRESS TABLE

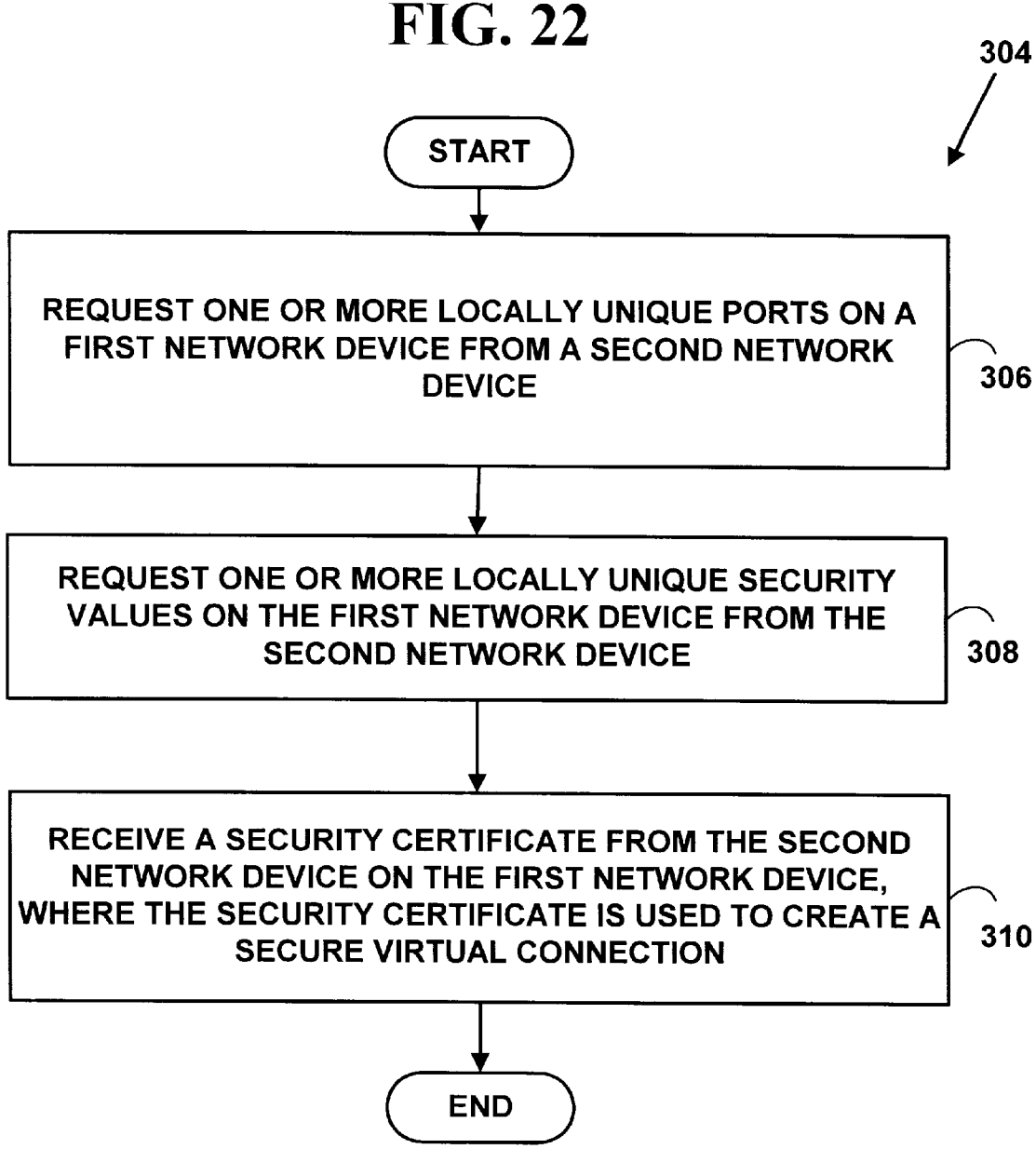

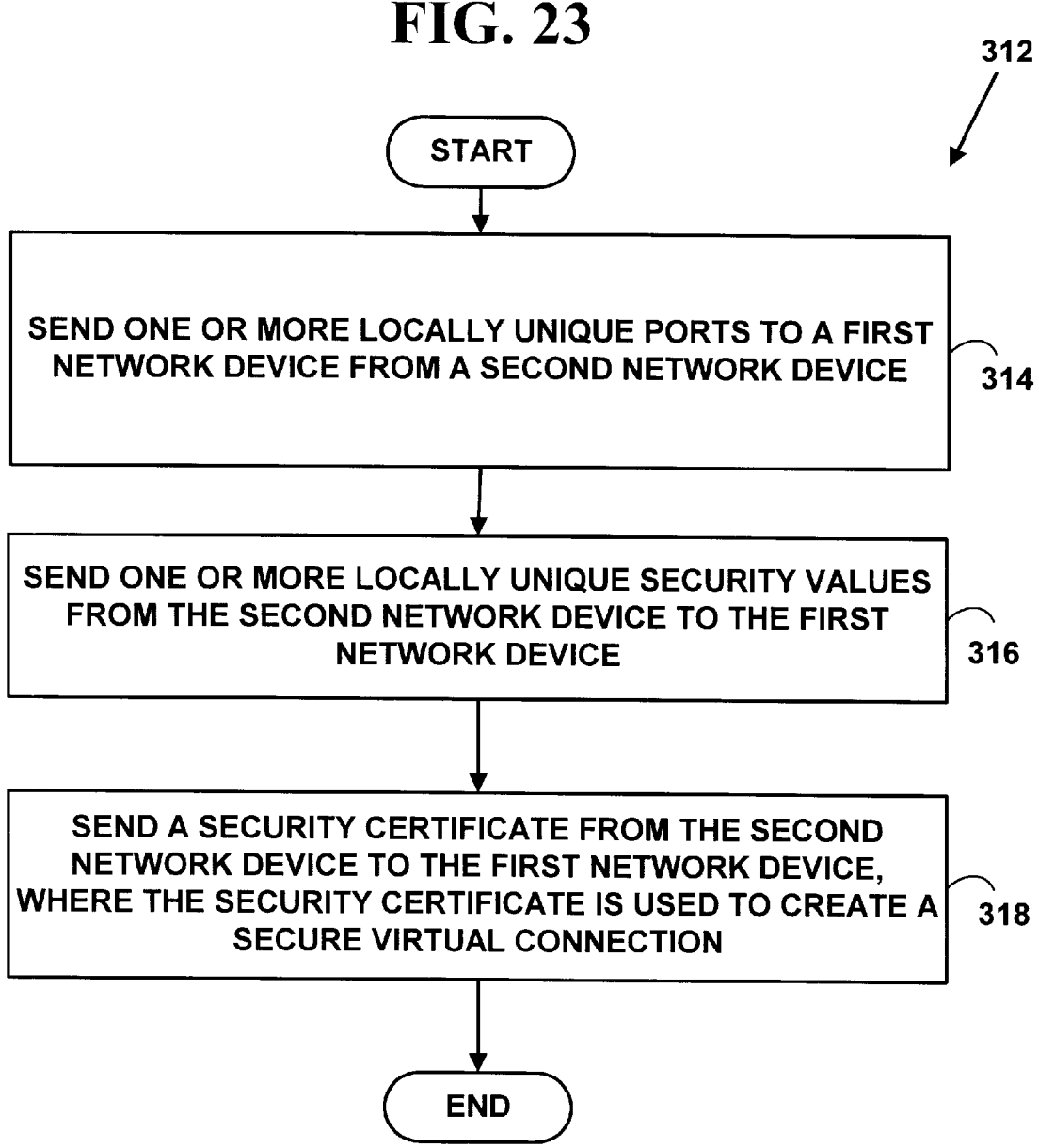

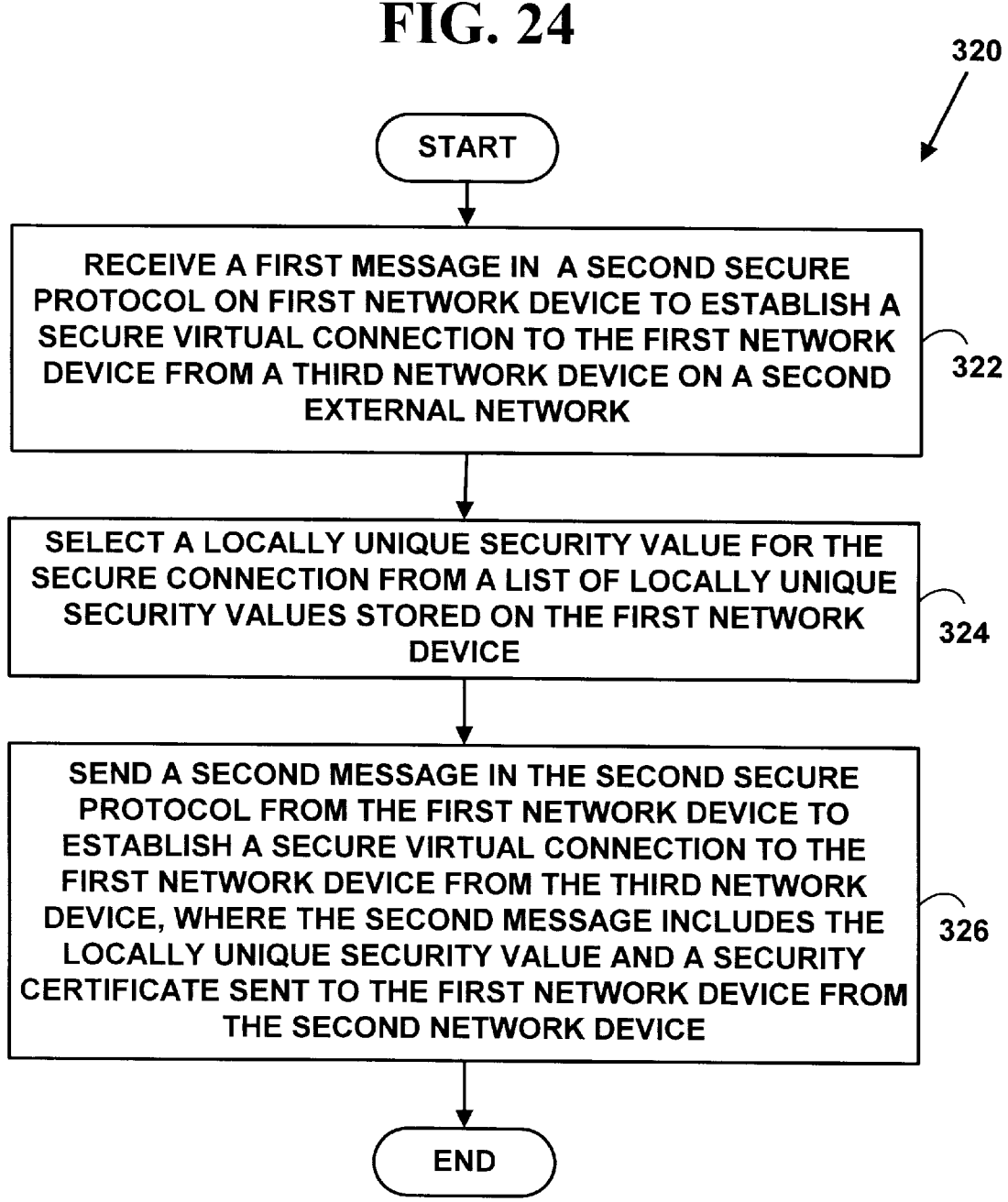

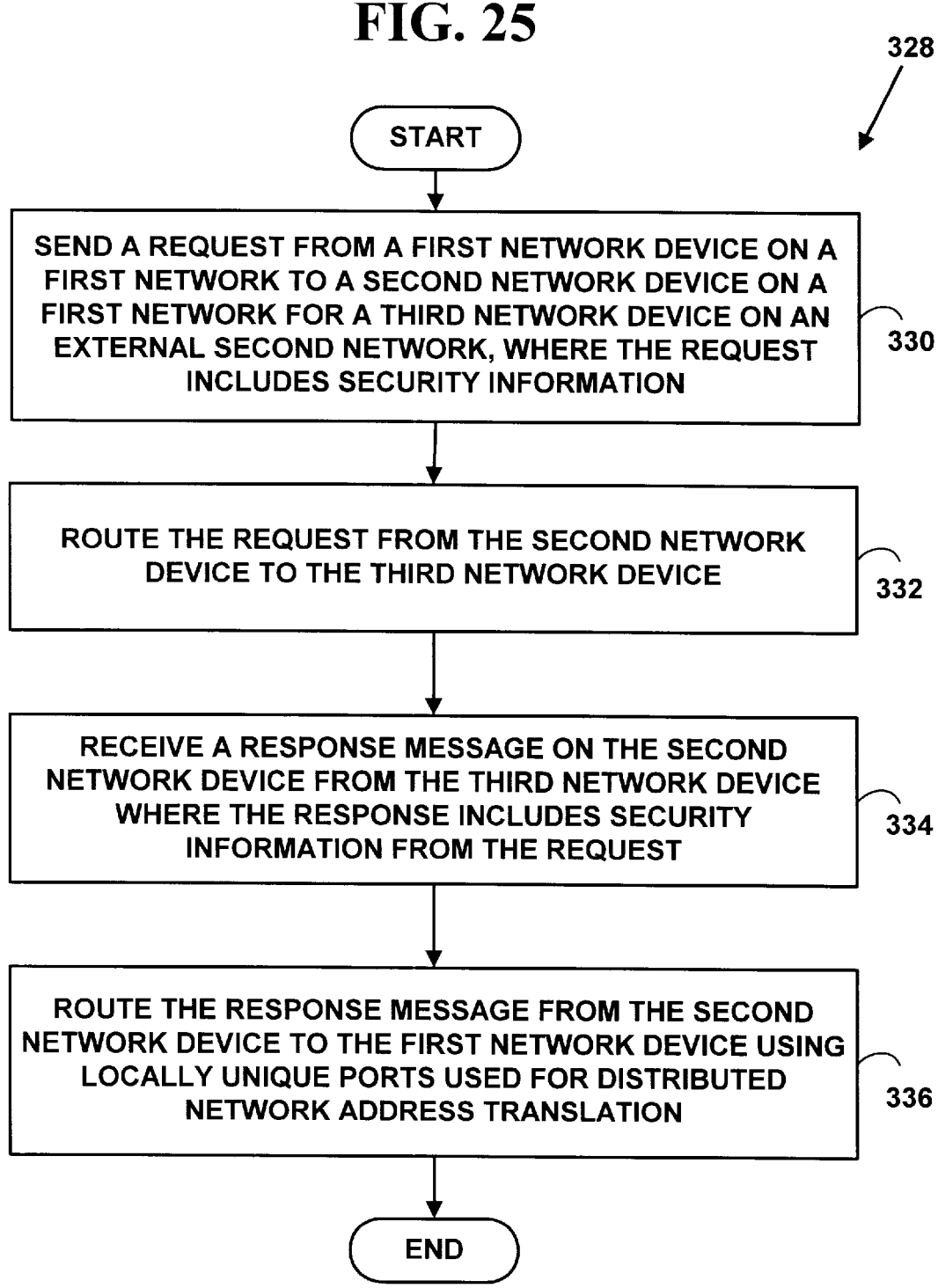

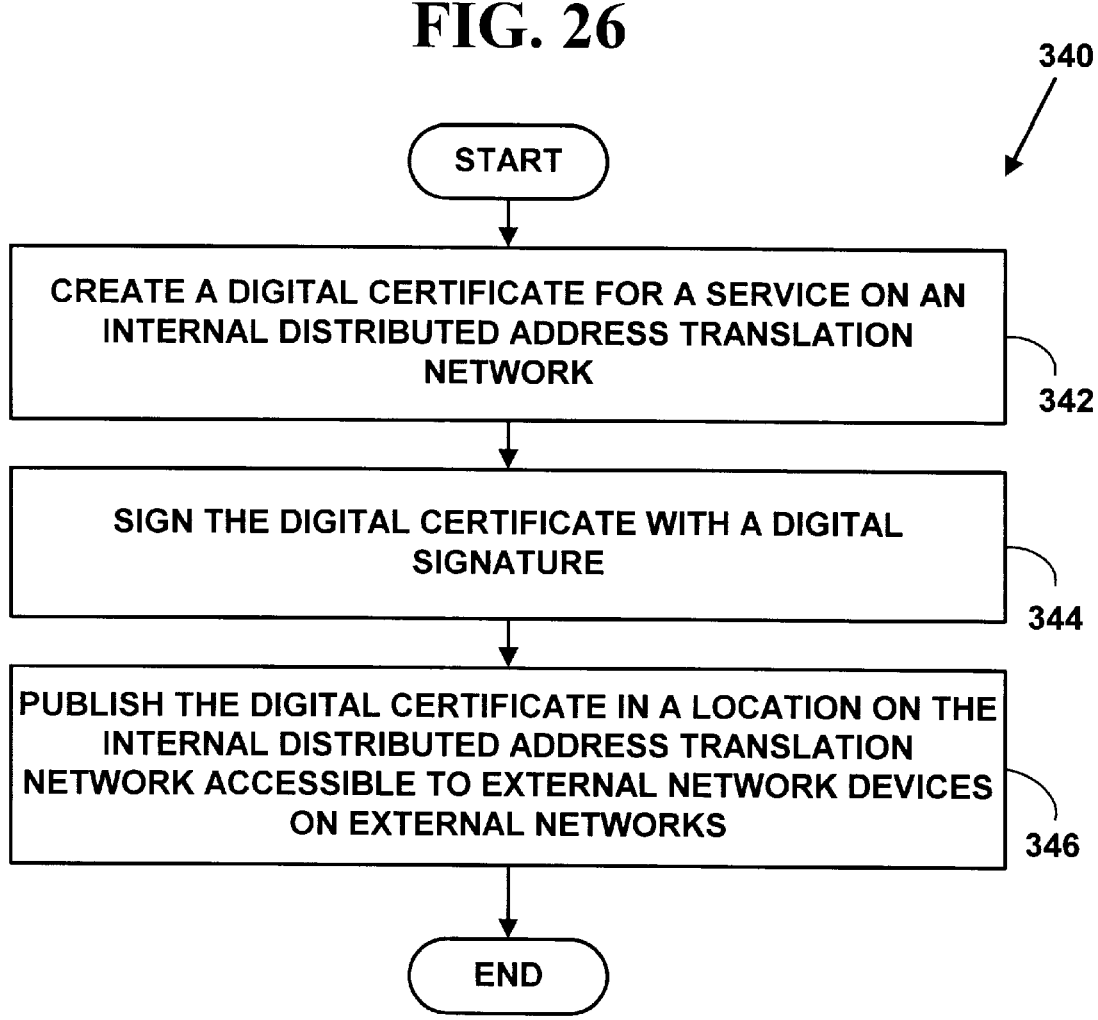

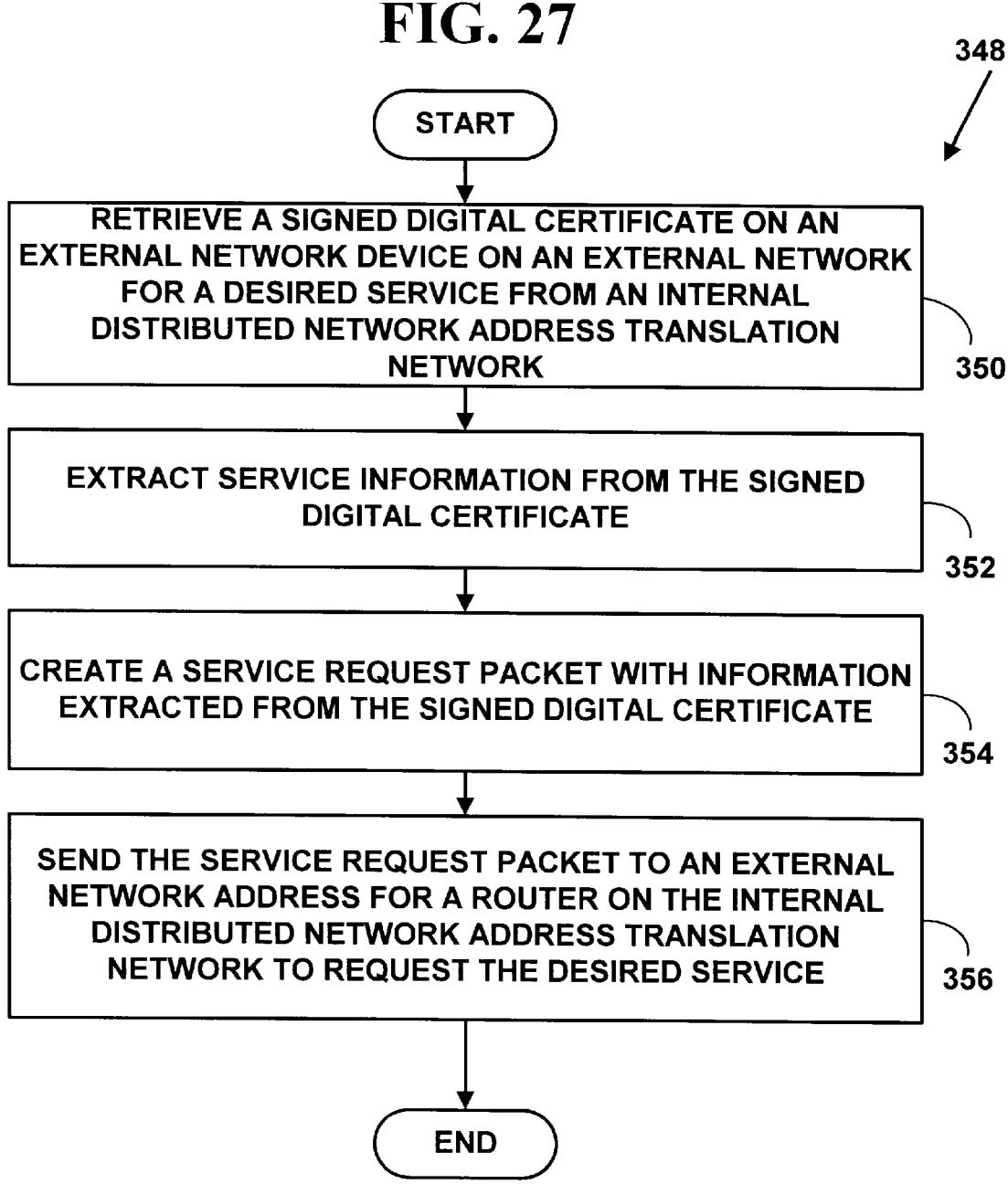

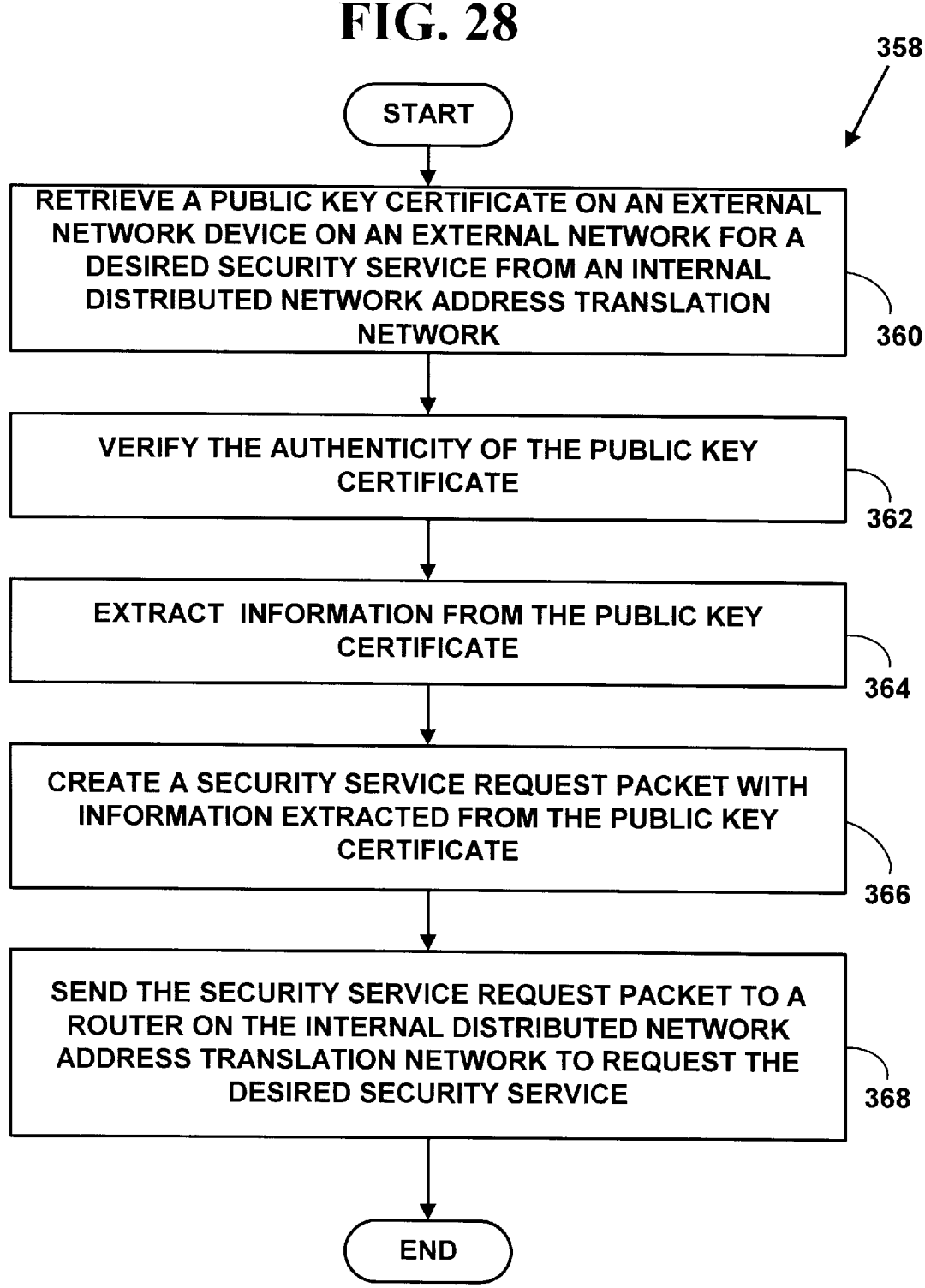

METHOD AND SYSTEM FOR LOCATING NETWORK SERVICES WITH DISTRIBUTED NETWORK ADDRESS TRANSLATION

CROSS REFERENCES TO RELATED APPLICATIONS

This application is a Continuation-In-Part of U.S. application Ser. No. 09/035,600 filed on Mar. 5, 1998.

FIELD OF INVENTION

This invention relates to computer networks. More specifically, it relates to a method and system for locating network services on a distributed network address translation network.

BACKGROUND OF THE INVENTION

The Internet Protocol ("IP") is an addressing protocol designed to facilitate the routing of traffic within a network or between networks. The Internet Protocol is used on many computer networks including the Internet, intranets and other networks. Current versions of Internet Protocol such as Internet Protocol version-4 ("IPv4") are becoming obsolete because of limited address space. With a 32-bit address-field, it is possible to assign $2^{32}$ different addresses, which is 4,294,967,296, or greater than 4 billion globally unique addresses.

However, with the explosive growth of the Internet and intranets, Internet Protocol addresses using a 32-bit address-field may soon be exhausted. Internet Protocol version-6 ("IPv6") proposes the use of a 128-bit address-field for IP addresses. However, a large number of legacy networks including a large number of Internet subnets will still be using older versions for Internet Protocol with a 32-bit address space for many years to come.

Network Address Translation ("NAT") has been proposed to extend the lifetime of Internet Protocol version 4 and earlier versions of Internet Protocol by allowing subnets to exist behind a single or small number of globally unique Internet Protocol addresses (see e.g., "The IP Network Address Translator", by P. Srisuresh and K. Egevang, Internet Engineering Task Force ("IETF"), Internet Draft <draft-rfced-info-srisuresh-05.tx>, February 1998). A single global Internet Protocol address is used for communication with external networks such as the Internet Internally, a sub-network ("subnet") uses local addressing. Local addressing may be either any addressing scheme that is different from Internet Protocol addressing, or a non-unique usage of Internet Protocol addresses. In either case, local addresses on a subnet are not used on the external, global Internet. When a device or node using local addressing desires to communicate with the external world, its local address is translated to a common external Internet Protocol address used for communication with an external network by a network address translation device. That is, network address translation allows one or more global Internet Protocol addresses to be shared among a larger number of local addresses.

There are several problems associated with using network address translation to extend the life of the Internet Protocol. Network address translation interferes with the end-to-end routing principal of the Internet that recommends that packets flow end-to-end between network devices without changing the contents of any packet along a transmission route (see e.g., "Routing in the Internet," by C. Huitema, Prentice Hall, 1995, ISBN 0-131-321-927).

Current versions of network address translation replace a local network address in a data packet header with an external global network address on outbound traffic, and replace an external network address in a data packet header with a local network address on inbound traffic. This type of address translation is computationally expensive, causes security problems by preventing certain types of encryption from being used, or breaks a number of existing applications in a network that cannot provide network address translation (e.g., File Transfer Protocol ("FTP")).

Current versions of network address translation may not gracefully scale beyond a small subnet containing a few dozen nodes or devices because of the computational and other resources required. Network address translation potentially requires support for many different internal network protocols be specifically programmed into a translation mechanism for external protocols in a network address translation device such as a network address translation router.

Computational burdens placed on a network address translation router may be significant and degrade network performance, especially if several network address translation-enabled sub-networks share the same network address translation router. In a worst case scenario, a network address translation router translates every inbound and outbound data packet. When network address translation is used to translate a Transmission Control Protocol/Internet Protocol or User Datagram Protocol/Internet Protocol data packet, the packet's Internet Protocol, Transmission Control Protocol or User Datagram Protocol checksums are recalculated.

As is known in the art, Transmission Control Protocol ("TCP") and User Datagram Protocol ("UDP") are often used over EP in computer networks. Transmission Control Protocol provides a connection-oriented, end-to-end reliable protocol designed to fit into a layered hierarchy of protocols that support multi-network applications. User Datagram Protocol provides a transaction oriented datagram protocol, where delivery and duplicate packet protection are not guaranteed.

When a port in a Transmission Control Protocol or User Datagram Protocol header is translated, the packet's Transmission Control Protocol or User Datagram Protocol checksums are also recalculated. This further increases the computational cost of translation in a network address translation router.

When an Internet Protocol address or port is translated with network address translation, a new length may result for the data packet and a possible change in a Transmission Control Protocol sequence number. A running sequence number offset (i.e., a delta) must then be maintained throughout the remainder of the connection. This delta must be applied to future traffic, including acknowledgment numbers further increasing computational time in a network address translation router.

In addition to Transmission Control Protocol or User Datagrain Protocol, a network address translation router may also translate network addresses, ports, change lengths and maintain sequence numbers for a number of different protocols that may use an Internet Protocol address or port number (e.g., FTP, H.323, H.324, CUSeeME, RealAudio, Internet Relay Chat and others). This translation may further increase computational time in a network address translation router.

Some of the problems associated with network address translation have been overcome with Distributed Network Address Translation ("DNAT") described in co-pending application Ser. No. 09/035,600. Distributed Network Address Translation is used with small office network, home office networks or other stub networks that have multiple network devices using a common external network address to communicate with an external network such as the Internet-Distributed Network Address Translation includes a Port Allocation Protocol to allocate locally unique ports to network devices on a stub computer network. The locally unique ports are used in a combination network address with a common external network address such as a global Internet Protocol address, to identify multiple network devices on the stub network to an external network such as the Internet, an intranet, or a public switched telephone network. Distributed Network Address Translation includes requesting one or more locally unique ports from network devices on a stub network, receiving the ports, and replacing default ports with the locally unique ports. The network devices on the local network use the combination network address with the common global external network address and the locally unique port to uniquely identify themselves during communications with an external network.

The Internet Protocol is used on global computer networks such as the Internet, and on many private networks such as intranets and Virtual Private Networks. It is often desirable to protect information sent with the Internet Protocol using different types of security. Using security with the Internet Protocol allows private or sensitive information to be sent over a public network with some degree of confidence that the private or sensitive information will not be intercepted, examined or altered.

Internet Protocol security ("IPsec") is a protocol for implementing security for communications on networks using the Internet Protocol through the use of cryptographic key management procedures and protocols. Internet Protocol security is used with Distributed Network Address Translation as is described in co-pending application Ser. No. 09/170,437. Communications between two endpoints of an Internet Protocol traffic flow are made end-to-end-secure by the Internet Protocol security protocol on an individual Internet Protocol packet-to-packet basis. Internet Protocol security protocol entities at connection endpoints have access to, and participate in, critical and sensitive operations that make a common connection secure.

Internet Protocol security currently includes two security services, each having an associated header that is added to an Internet Protocol packet that is being protected. The two security services include an Authentication Header ("AH") and an Encapsulating Security Payload ("ESP") header. The Authentication Header provides authentication and integrity protection for an Internet Protocol packet. The Encapsulating Security Payload header provides encryption protection and authentication for an Internet Protocol packet.

The Internet Protocol security protocol headers are identified in a protocol field of an Internet Protocol data packet header. The Internet Protocol security protocol header specifies the type (e.g., Authentication Header or Encapsulating Security Payload) and contains a numerical value called the Security Parameter Index ("SPI"). The Security Parameter Index together with a destination Internet Protocol address and Internet Security protocol form a unique identifier used by a receiving system to associate a data packet with a construct called a "security association." The Security Parameter Index is used by the receiving system to help correctly process an Internet Protocol packet (e.g., to decrypt it, or to verify its integrity and authenticity).

Internet Protocol security establishes and uses a Security Association ("SA") to identify a secure channel between two endpoints. A Security Association is a unidirectional session between two termination endpoints. Two termination endpoints of a single Security Association define a logical session that is protected by Internet Protocol security services. One endpoint sends Internet Protocol packets, and a second endpoint receives the Internet Protocol packets. Since a Security Association is unidirectional, a minimum of two Security Associations is required for secure, bi-directional communications. It is also possible to configure multiple layers of Internet Protocol security protocols between two endpoints by combining multiple Security Associations.

It is desirable to locate and use services on network devices on a stub network that uses Distributed Network Address Translation. However, there are several problems associated with locating and using services on a stub network that uses Distributed Network Address Translation. An internal network device on a stub network typically has only a locally routable network address and relies on Distributed Network Address Translation for communications with an external network such as the Internet. There is no easy way for an external network device on an external network to determine what internal network devices might be available on a stub network using Distributed Network Address Translation since the internal network devices have only locally routable network addresses that are not visible to an external network.

Another problem is that external network device cannot determine what services the internal network devices may be capable of providing (e.g., Telnet, Hyper Text Transfer Protocol, File Transfer Protocol, etc.). When an external application running on an external network wishes to contact a service running on an internal network device, the external application must obtain the appropriate service information. For example, the external application needs to obtain a port or other protocol parameters associated with the available service. There is no easy way to determine such information for an internal network device stub network using Distributed Network Address Translation.

Yet another problem is establishing secure communications between an external network device and an internal network device on an internal network device stub network using Distributed Network Address Translation. For example, an external network devices desires to contact an Internet Protocol security, Internet Key Exchange protocol ("IKE") service, on an internal network device in order to create an Internet Protocol Security Association. If the Internet Key Exchange protocol implementations on the two network devices can communicate, they can establish Security Associations and their associated Security Parameter Indexes, which will allow packets to be securely routed between the two network devices. Furthermore, if the external network device can obtain a port associated with a service running on an internal network device, it can use this port information to contact the service and establish a Security Association. There is no easy way to determine what security services night be available on a stub network using Distributed Network Address Translation.

Thus, it desirable to allow an external network device to locate and/or communicate with services on internal network devices on a stub network using Distributed Network Address Translation. It is also desirable to allow secure communications between an internal network device on a stub network using Distributed Network Address Translation and an external network device on an external network such as the Internet using Internet Protocol security and other security protocol.

SUMMARY OF THE INVENTION

In accordance with preferred embodiments of the present invention, some of the problems associated with distributed network address translation are overcome. Methods and system for locating network services with distributed network address translation is provided One aspect of the present invention includes a method for allowing services to be identified on an internal distributed network address translation network. This method includes creating digital certificate to identify a service on an internal network device. The digital certificate includes a network address valid outside an internal distributed network address translation network, service name, service parameters and an optional public encryption key. One or more of the service parameters may be obtained with a Port Allocation Protocol used for distributed network address translation. The digital certificate is signed with a secure digital signature. The digital certificate is published in a location on the internal network accessible to external network devices on external networks. The digital certificate is used by an external network device to request a desired service from an internal network device on the internal distributed network address translation network. In one exemplary preferred embodiment of the present invention, the digital certificate is a public encryption key certificate for an Internet Protocol security service. However, the present invention is not limited to public encryption key certificates or Internet Protocol security services and other digital certificates and desired services can also be used.

Another aspect of the invention includes a method for requesting services from internal network devices on an internal distributed network address translation network. This method includes retrieving a signed digital certificate on an external network device on an external network from an internal distributed network address translation network for a desired service. The digital certificate includes a digital signature, a network address for an internal network device valid outside the internal distributed network address translation network, a service name, service parameters and an optional public encryption key. Information is extracted from the signed digital certificate. A service request packet is created with information extracted from the signed digital certificate to request the desired service on the internal distributed network address translation network.

The service request packet is sent to a router on the internal distributed network address translation network to request the desired service from an internal network device on the internal distributed address translation network. In one exemplary preferred embodiment of the present invention, the desired service is an Internet Protocol security service. However, the present invention is not limited to Internet Protocol security services and other desired services could also be used.

External network devices can now locate and request services, and security services, on internal network devices on internal distributed network address translation networks that were previously unavailable to the external network devices. The foregoing and other features and advantages of a preferred embodiment of the present invention will be more readily apparent from the following detailed description, which proceeds with references to the accompanying drawings.

BRIEF DESCRIPTION OF THE DRAWINGS

Preferred embodiments of the present inventions are described with reference to the following drawings, wherein:

FIG. 7 is a block diagram illustrating a PAP combined network address layout;

FIG. 8 is a block diagram illustrating a PAP port-to-internal network address table layout;

FIG. 11 illustrates a source port transition table layout;

FIG. 12 illustrates an Internet Protocol address translation table layout;

FIG. 15 is a block diagram illustrating an Internet Protocol packet header format;

FIG. 21 is a block diagram illustrating a SPI-to-internal network address table layout;

FIG. 22 is a flow diagram illustrating a method for providing a security association using distributed network address translation;

FIG. 23 is a flow diagram illustrating a method for distributed network address translation using security;

FIG. 24 is a flow diagram illustrating a method for distributed network address translation using security;

FIG. 25 is a flow diagram illustrating a method for distributed network address translation with security;

FIG. 26 is a flow diagram illustrating a method for identifying internal networks devices and services on an internal network using distributed network address translation;

FIG. 27 is a flow diagram illustrating a method for requesting services from internal network devices on an internal network using distributed network address translation; and FIG. 28 is a flow diagram illustrating a method for requesting security services from internal network devices on an internal network using distributed network address translation.

DETAILED DESCRIPTION OF PREFERRED EMBODIMENTS

Exemplary network system

Figure 1:
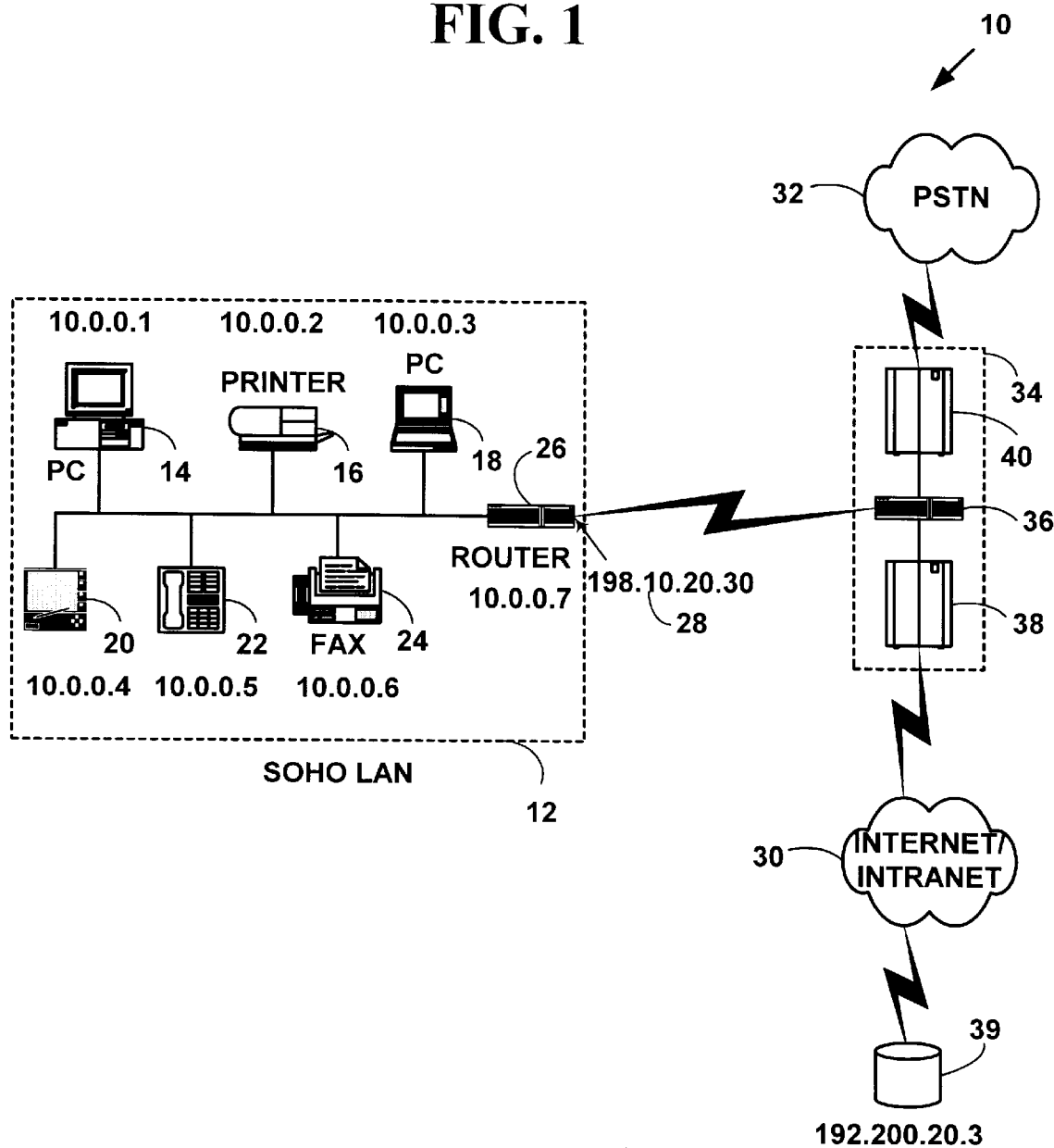
FIG. 1 is a block diagram illustrating a network system for distributed address translation.

FIG. 1 is a block diagram illustrating an exemplary network system 10 for one preferred embodiment of the present invention. The network system 10 includes a first computer network 12 with multiple network devices (14, 16, 18, 20, 22, 24) and a router 26 to route data packets to another external computer network. The multiple network devices include any of computers (14, 18), printers 16, facsimile devices 24, hand-held devices 20, telephones 22 or other network devices not illustrated in FIG. 1. The first computer network 12 has an external common network address 28 (e.g., a global Internet Protocol address 198.10.20.30) to identify the first network 12 to an external computer network such as a second computer network 30 and/or a third computer network 32 external to first computer network 12. The multiple network devices (14, 16, 18, 20, 22, 24, and 26) have an internal network address (i.e., a private network address) on the first computer network 12 (e.g., 10.0.0.x explained below). In one preferred embodiment of the present invention, a network access service provider 34 with a router 36 routes data packets to/from first computer network 12 to second computer network 30 and/or third computer network 32 through a second network switch 38 and/or a third network switch 40. In another embodiment of the present invention, the first computer network exemplary 12 is connected directly to second computer network 30.

In one preferred embodiment of the present invention, the first computer network 12 is a Small Office/Home Office ("SOHO") Local Area Network ("LAN"), also called a "legacy" LAN. First computer network 12 is also called a "stub" network. As is known in the art, a stub network typically includes multiple network devices using a common external network address to communicate with an external network such as the Internet. The second network 30 is the Internet or an intranet, and the third network 32 is a Public Switched Telephone Network ("PSTN"). However, other network types and network components can also be used and the present invention is not limited to the network types and network components described for this preferred embodiment. The present invention can be used with virtually any network using the Internet Protocol or other protocols in the Internet Protocol suite.

Network devices and routers for preferred embodiments of the present invention include network devices that can interact with network system 10 based on standards proposed by the Institute of Electrical and Electronic Engineers ("IEEE"), International Telecommunications Union-Telecommunication Standardization Sector ("ITU"), Internet Engineering Task Force ("IETF"), or Wireless Application Protocol ("WAP") Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The WAP standards can be found at the URL "www.wapforum.org."

An operating environment for network devices and routers of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

In network address translation schemes known in the art, the router 26 translates an internal network address such as an internal network address used on the first computer network 12 to an external network address such as a network address for outgoing traffic to the second network 30 or the third network 32. The router 26 also translates an external network address to an internal network address for incoming traffic from the second network 30 or the third network 32. A Network Address Translation ("NAT") router assumes the entire computation burden for network address translation. For large subnets, the NAT router becomes a bottleneck. In the worst case, every packet passing through the NAT router will require address translation. For more information on network address translation for the Internet Protocol see "The IP Network Address Translator (NAT)," Internet Engineering Task Force ("IETF") Request For Comments ("RFC") RFC-1631, "NAT Bypass for 'End 2 End' sensitive applications," by G. Tsirtsis and A. O'Niell, IETF Internet Draft, <draft-tsirtsis-nat-bypass-00.txt>, January 1998, or "The IP Network Address Translator", by P. Srisuresh and K. Egevang, Internet Engineering Task Force ("IETF"), Internet Draft <draft-rfced-info-srisuresh-05.txt>, February 1998.

In one preferred embodiment of the present invention, Distributed Network Access Translation ("DNAT") is used. Network devices (14, 16, 18, 22 and 24) on the first computer network 12 request a set of locally unique ports from the router 26 for external communications with the external second network 30 or the third network 32. A locally unique port is unique inside of the first computer network 12 and typically is not unique outside of first computer network 12. Locally unique ports may be used for mobile network devices, such as device 20 using Mobile Internet Protocol, that are not permanently attached to the first computer network 12. A mobile network device may physically relocate to another location and attach to a foreign computer network (i.e., other than home computer network 12).

The network devices (14, 16, 18, 20, 22, 24) replace default or ephemeral ports with the locally unique ports and use a combination network address including a locally unique port and a common external network address (e.g., an IP address) for communications with the external networks 30 and 32. A default port is typically statically assigned. An ephemeral port is typically dynamically assigned for a specified duration of time.

DNAT Protocol Stack

Figure 2:
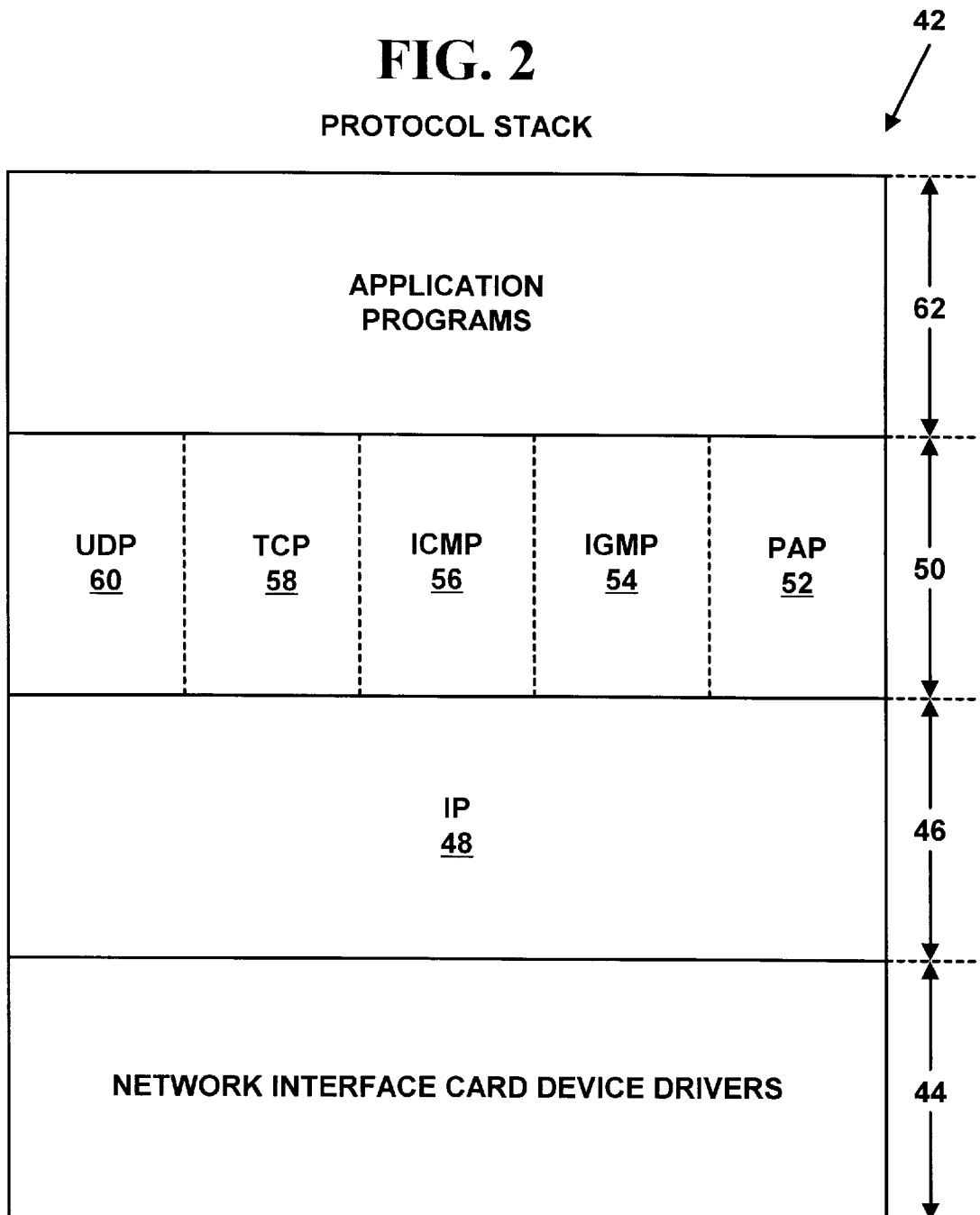
FIG. 2 is a block diagram illustrating a protocol stack for a network device.

FIG. 2 is a block diagram illustrating a layered protocol stack 42 for a network device from the first computer network 12 used for DNAT. The layered Protocol stack 42 is described with respect to Internet Protocol suites comprising from lowest-to-highest, a link, network, transport and application layer. However, more or fewer layers could also be used, and different layer designations could also be used for the layers in the protocol stack 42 (e.g., layering based on the Open Systems Interconnection ("OSI") model).

The network devices (14, 16, 18, 20, 22, and 24) are connected to the first computer network 12 with Network Interface Card ("NIC") device drivers 44 for the hardware network devices connecting the network devices to the computer network 12. Above the network interface card device drivers 44 is a network layer 46 (also called the Internet Layer for Internet Protocol suites). The network layer 46 includes an IP layer 48. As is known in the art, IP 48 is an addressing protocol designed to route traffic within a network or between networks. IP layer 48, hereinafter IP 48, is described RFC-791, incorporated herein by reference.

Above network layer 46 is a transport layer 50. The transport layer 50 includes a Port Allocation Protocol ("PAP") layer 52, an Internet Group Management Protocol ("IGMP") layer 54, a Control Message Protocol ("ICMP") layer 56, a Transmission Control Protocol ("TCP") layer 58 and a User Datagram Protocol ("UDP") layer 60. However, more or fewer protocols could also be used.

The PAP layer 52 allocates locally unique ports to a network device. In one embodiment of the present invention, the PAP layer 52, is a separate protocol layer in the network layer 46. In another embodiment of the present invention, the PAP layer 52 is implemented as part of the ICMP layer 50 and is not a separate protocol layer. In yet another embodiment of the present invention, PAP layer 52 is run over either a Transmission Control Protocol or User Datagram Protocol. PAP layer 52 is explained below.

IGMP layer 54, hereinafter IGMP 54, is responsible for multicasting. For more information on IGMP 54 see RFC-1112, incorporated herein by reference.

ICMP layer 56, hereinafter ICMP 56, is used for Internet Protocol control. The main functions of ICMP 56 include error reporting, reachability testing (e.g., "pinging"), route-change notification, performance, subnet addressing and other maintenance. For more information on ICMP 56 see RFC-792, incorporated herein by reference.

TCP layer 58, hereinafter TCP 58, provides a connection-oriented, end-to-end reliable protocol designed to fit into a layered hierarchy of protocols which support multi-network applications. TCP 58 provides for reliable inter-process communication between pairs of processes in network devices attached to distinct but interconnected networks. For more information on TCP 58 see RFC-793, incorporated herein by reference.

UDP layer 60, hereinafter UDP 60, provides a connectionless mode of communications with datagrams in an interconnected set of computer networks. UDP 60 provides a transaction oriented datagram protocol, where delivery and duplicate packet protection are not guaranteed. For more information on UDP 60 see RFC-768, incorporated herein by reference. Both TCP 58 and UDP 60 are not required in protocol stack 42. Either TCP 58 or UDP 60 can be used without the other.

Above transport layer 56 is an application layer 62 where application programs to carry out desired functionality for a network device reside. For example, the application programs for the network device 16 may include printer application programs, while application programs for the network device 24 may include facsimile application programs more or fewer protocol layers can also be used in the protocol stack 42.

DNAT Protocol

Figure 3:
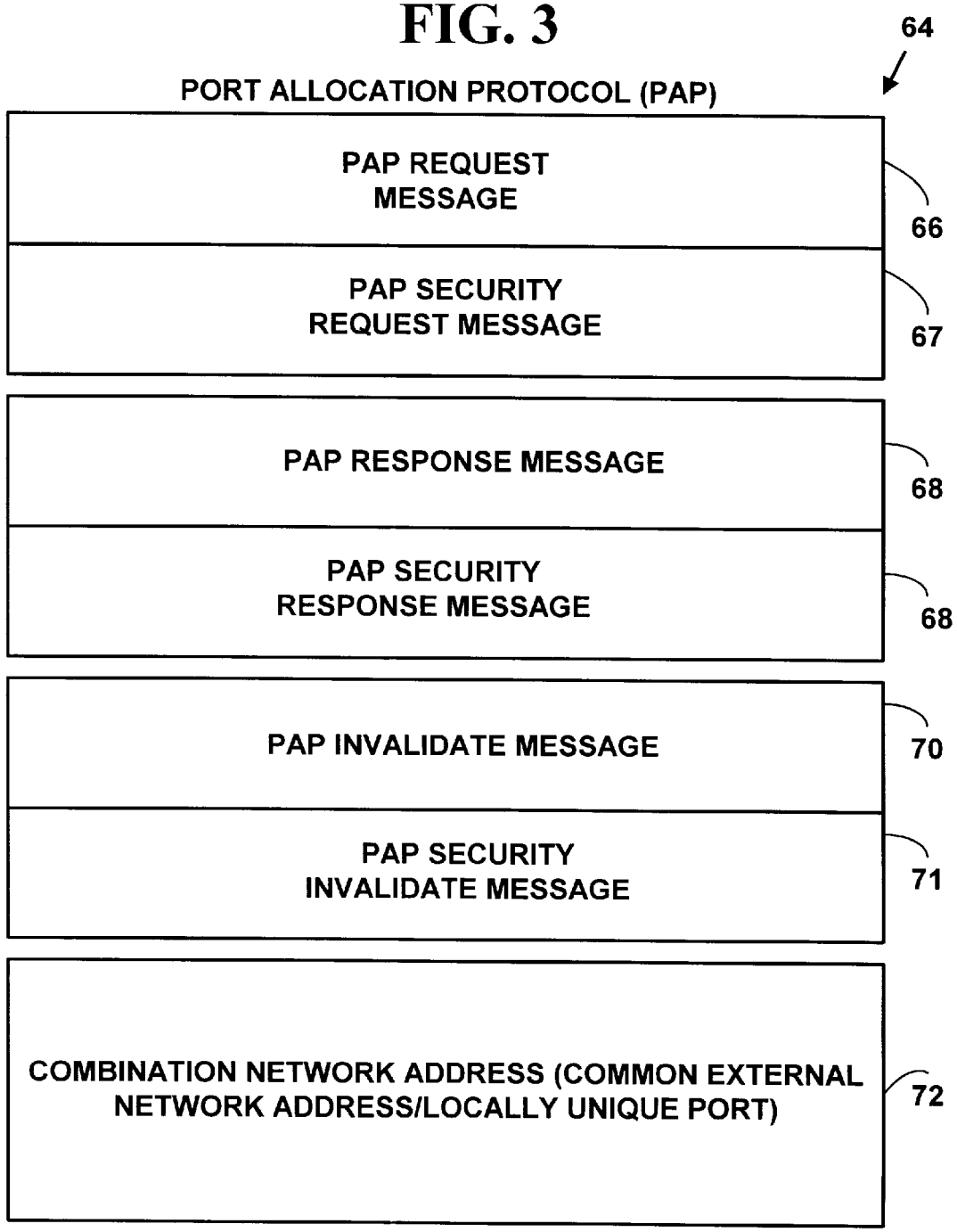
FIG. 3 is a block diagram illustrating a port allocation protocol ("PAP")

FIG. 3 is a block diagram illustrating a Port Allocation Protocol ("PAP") 64. PAP 64 is implemented in a separate PAP layer 52 or as an integral part of ICMP 50 in the protocol stack 42 (FIG. 2). PAP 64 includes a PAP request message 66, a PAP response message 68, a PAP invalidate message 70 and a combination network address 72. PAP 64 also includes a PAP security request message 67, a PAP security response message 69, a PAP security invalidate message 71. The PAP security messages 67, 69, 71 are used for Internet Protocol security and are explained below. In one preferred embodiment of the present invention, fields in the PAP messages (66, 68, 70, 67, 69, 71) follow standard ICMP 50 message format. However, other message layouts (i.e., Non-ICMP 50 message format) and more or fewer messages could also be used for PAP 64 messages.

In one preferred embodiment of the present invention, the PAP request message 66 is sent from a network device (14, 16, 18, 20, 22, and 24) to the router 26, to request a block of locally unique port numbers. In another embodiment of the present invention, the PAP 64 is used with another network device (e.g., a port server or other network device separate from the router 26). In another preferred embodiment of the present invention, the PAP 64 is used to request a block of Security Parameter Indexes ("SPI") that will be used to establish Security Associations ("SA") when Internet Protocol security ("IPsec") is used Use of the SPIs will be explained below.

Figure 4:
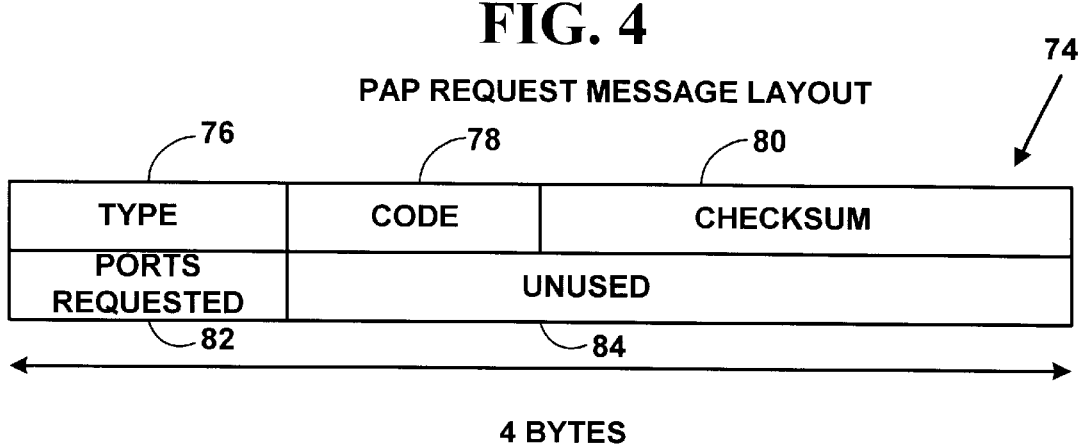
FIG. 4 is a block diagram illustrating a PAP request message layout.

FIG. 4 is a block diagram illustrating a PAP request message layout 74. A type-field 76 is one-byte and has a value (e.g., 32) for requesting locally unique ports. A code-field 78 is one-byte and has a value of zero for ports under 10,000 and a value of one for ports 10,000 or above. A checksum-field 80 is two-bytes, and has a value of a 1's complement sum of the entire PAP request message 66 layout 74. As is known in the art, a 1's complement for a value written in binary or base-2 (i.e., has only zero's and one's) is the inverse of a existing one or zero. For example, a 1's compliment of $110_2$ is $001_2$.

The ports-requested-field 82 is one-byte and has a variable value indicating a number of locally unique ports requested by a network device. By default the ports-requested-field 82 is 16 or 32, which is a reasonable number for most network devices. However, other default numbers could also be used. Unused-field 84 is three-bytes and has a value of zero. However, other layouts, values and field sizes could also be used for the PAP request message 66.

In one preferred embodiment of the present invention, a network device transmits a PAP request message 66 upon boot. The PAP 64 is associated with Dynamic Host Configuration Protocol ("DHCP") or BOOTstrap Protocol ("BOOTP"). DHCP is a protocol for passing configuration information such as IP 48 addresses to hosts on an IP 48 network. For more information on DHCP see RFC-1541 and RFC-2131, incorporated herein by reference. The format of DHCP messages is based on the format of BOOTP messages described in RFC-951 and RFC-1542, incorporated herein by reference. From a network device's point of view, DHCP is an extension of the BOOTP mechanism.

In another embodiment of the present invention, the network devices (14, 16, 18, 20, 22, 24) request locally unique ports after boot when a protocol layer in the layered protocol stack 42 makes an initial request for an external network (e.g., 30 or 32). The network devices (14, 16, 18, 20, 22, and 24) may also request more locally unique ports when the number of locally unique ports required falls below the number of locally unique ports allocated to the network devices.

The PAP request message 66 is sent from a network device (14, 16, 18, 20, 22, and 24) to the router 26 after attaching an IP 48 header or other message header. A PAP response message 68 is sent from the router 26 back to the network devices (14, 16, 18, 20, 22, 24) either confirming or denying the PAP request message 66.

Figure 5:
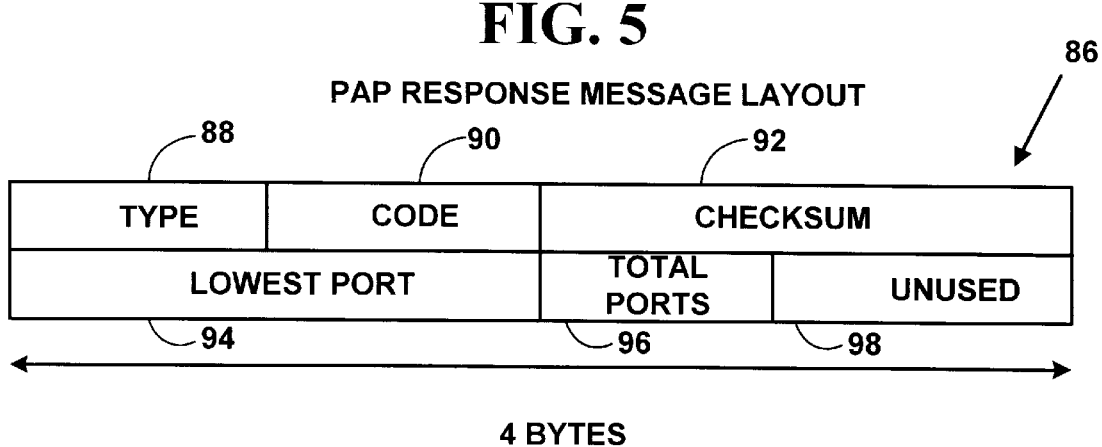
FIG. 5 is a block diagram illustrating a PAP response message layout.

FIG. 5 is a block diagram illustrating a PAP response message layout 86. A type-field 88 is one-byte and has a value for receiving responses (e.g., 32). A code-field 90 is one-byte and has a value of zero for failure and one for success. A checksum-field 92 is two-bytes and is a 16-bit 1's complement sum of the entire PAP response message 68. A lowest-port-field 94 is two-bytes and is a lowest locally unique port number allocated in a block of locally unique ports. A total-ports-field 96 is one-byte and is the total number of locally unique ports allocated to the network device. An unused-field 98 is one-byte and has a value of zero. However, other layouts, values and field sizes could also be used for the PAP response message 68.

Upon receiving a successful PAP response message 68, a network device saves the block of locally unique ports that it may use. The locally unique ports are saved in a data structure with a flag-field indicating whether the locally unique port is allocated or unused. Table 1 is pseudo-code for an exemplary data structures to store locally unique port information. However, other data structures or layouts could also be used.

TABLE 1

```
struct unique_ports
{
    int port_number;
    flag status:1; /* one bit flag, 0 = unused, 1 = allocated */
}u_ports[MAX_GL];
int number_of_u_ports; /* number of locally unique ports allocated */
```

The one or more locally unique ports are allocated to protocols and applications in the layered protocol stack 42 on a network device to replace default or ephemeral ports. Upon receiving an unsuccessful PAP response message 68 a network device may send another PAP request message 66 for fewer ports. If the router 26 cannot allocate a large enough block of contiguous locally unique ports for the network device, it may send a PAP response 68 with a success code, but allocate fewer locally unique ports than requested.

Figure 6:
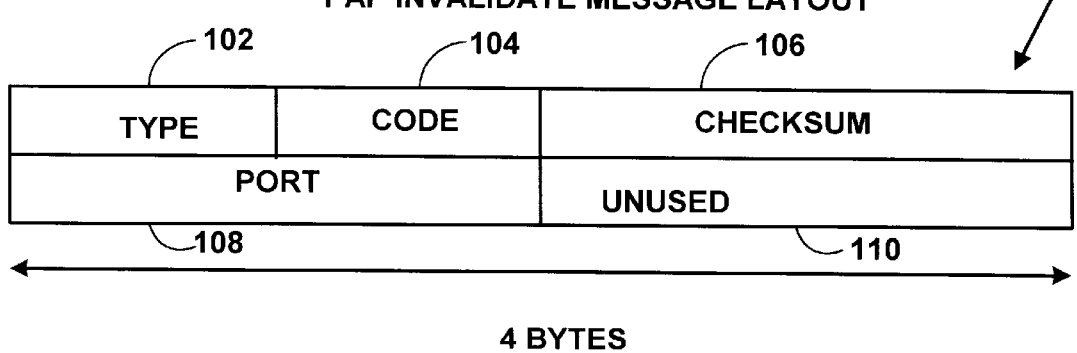
FIG. 6 is a block diagram illustrating a PAP invalidate message layout.

FIG. 6 is a block diagram illustrating a PAP invalidate message layout 100. A PAP invalidate message 70 is used to invalidate or de-allocate a block of locally unique ports currently allocated to a network device. A type-field 102 is one-byte and has a value to de-allocate ports (e.g., 32). A code-field 104 is one-byte and has a value of two. A checksum-field 106 is two-bytes and is a 1's complement sum of the entire PAP invalidate message 70. A port-field 108 is one-byte and has a value of a locally unique port number used by the network device that is being invalidated or de-allocated. An unused-field 110 is three-bytes and has a value of zero. However, other layouts, values and field sizes could also be used for PAP invalidate message 70.

It is possible that two network devices may be allocated overlapping blocks of locally unique ports as a result of the router 26 crashing or rebooting. The router 26 should send a PAP invalidate messages 70 to invalidate all locally unique ports in use upon reboot to help prevent this problem. A network device (14, 16, 18, 20, 22, and 24) also sends a PAP invalidate message 70 when it no longer needs a locally unique port.

FIG. 7 is a block diagram illustrating a combined network address layout 112 for combined network address 72. However, other layouts could also be used. The combined network address layout 112 includes a common external network address 114 such as an IP 48 address (e.g., a common network address 28), and a locally-unique port 116 obtained by sending a PAP request message 66 and receiving a PAP response message 68 from a network device. The network devices (14, 16, 18, 20, 22, 24) use the combined network address 72 for communications with the external second network 30 or the third network 32. The common external network address 114 identifies the first computer network 12 to an external second computer network (e.g., 30 or 32).

As is known in the art, to identify separate data streams, TCP 58 provides a source port field in a TCP 58 header and a source address field in an IP 48 header. For more information on TCP headers see RFC-793. Since default or ephemeral port identifiers are typically assigned independently by a TCP 58 stack in a network, they are typically not unique. To provide for unique addresses within a TCP 58 stack, a local Internet address identifying a TCP stack 58 can be concatenated with a default or ephemeral port identifier, a remote Internet address and a remote port identifier to create an "association." The association is unique throughout all networks connected together. Associations are known to those skilled in the networking arts.

In a preferred embodiment of the present invention, the source port in a header is given a locally unique port obtained with PAP 64 and given a common external network address. Together they uniquely identify applications and protocols on the network devices (14, 16, 18, 20, 22, 24) on the first computer network 12 to the second external computer network (e.g., 30 or 32) with a value conceptually similar to an association used by a TCP stack 58.

As is also known in the art, UDP 60 also has a source port field in a UDP header. For more information on UDP 60 headers see RFC-768. The UDP 60 source port is a non-optional field. It indicates a port of the sending process and is assumed to be the port to which a reply should be addressed in the absence of any other information. If not used, a value of zero is inserted. A UDP 60 header also has a source address field. A locally unique port can also be used in a UDP 60 header.

In a preferred embodiment of the present invention, the PAP 64 is used to create combination network address 72 that is used in the TCP 58 or UDP 60 header fields. In another embodiment of the present invention, the combination network address 72 is stored in other message header fields understood by the router 26 (i.e., non-IP 48 TCP 58 or UDP 60 fields), the first computer network 12, the second computer network 30 and the third computer network 32.

In a preferred embodiment of the present invention, the router 26 allocates blocks of locally unique ports to network devices (14, 16, 18, 20, 22, and 24). However, other network devices could also be used to allocate locally unique ports (e.g., a port server). The router 26 maintains a port-to-internal network address table as locally unique ports are allocated. The router 26 also has an internal table indicating internal network addresses for all the network devices (14, 16, 18, 20, 22, 24) on the first computer network 12. In a preferred embodiment of the present invention, the internal network addresses for the first computer network 12 are private IP 48 addresses. For example, the computer 14 has an internal IP address of 10.0.0.1 (FIG. 1), the printer 16, 10.0.0.2, the computer 18, 10.0.0.3, the hand held computer, 20, 10.0.0.4, the telephone 22, 10.0.0.5, the facsimile, 24, 10.0.0.6, and the router 26, 10.0.0.7, in FIG. 1. The internal addresses are not published on the external computer network (e.g., the Internet or an intranet). However, other internal network addresses could also be used (e.g., Medium Access Control ("MAC") protocol addresses).

FIG. 8 is a block diagram illustrating a port-to-internal address table 118 layout maintained by the router 26. However, other layouts and more or fewer rows and columns could also be used. The port-to-internal address table 1 18 layout has three columns: an internal-network-address column 120, a lowest-port column 122, and a number-of-ports column 124. However, more or fewer columns or other table layouts could also be used. First row 126 indicates that a network device has been allocated ports 1026–1057 for use with internal network address, 10.0.0.1, (e.g., computer 14). A second network device has been allocated ports 1058–1073 for use with internal network address 10.0.0.3 (e.g., computer 18). An internal network address may have several entries in port-to-internal address table 118.

Distributed Network Address Translation

Figure 9:
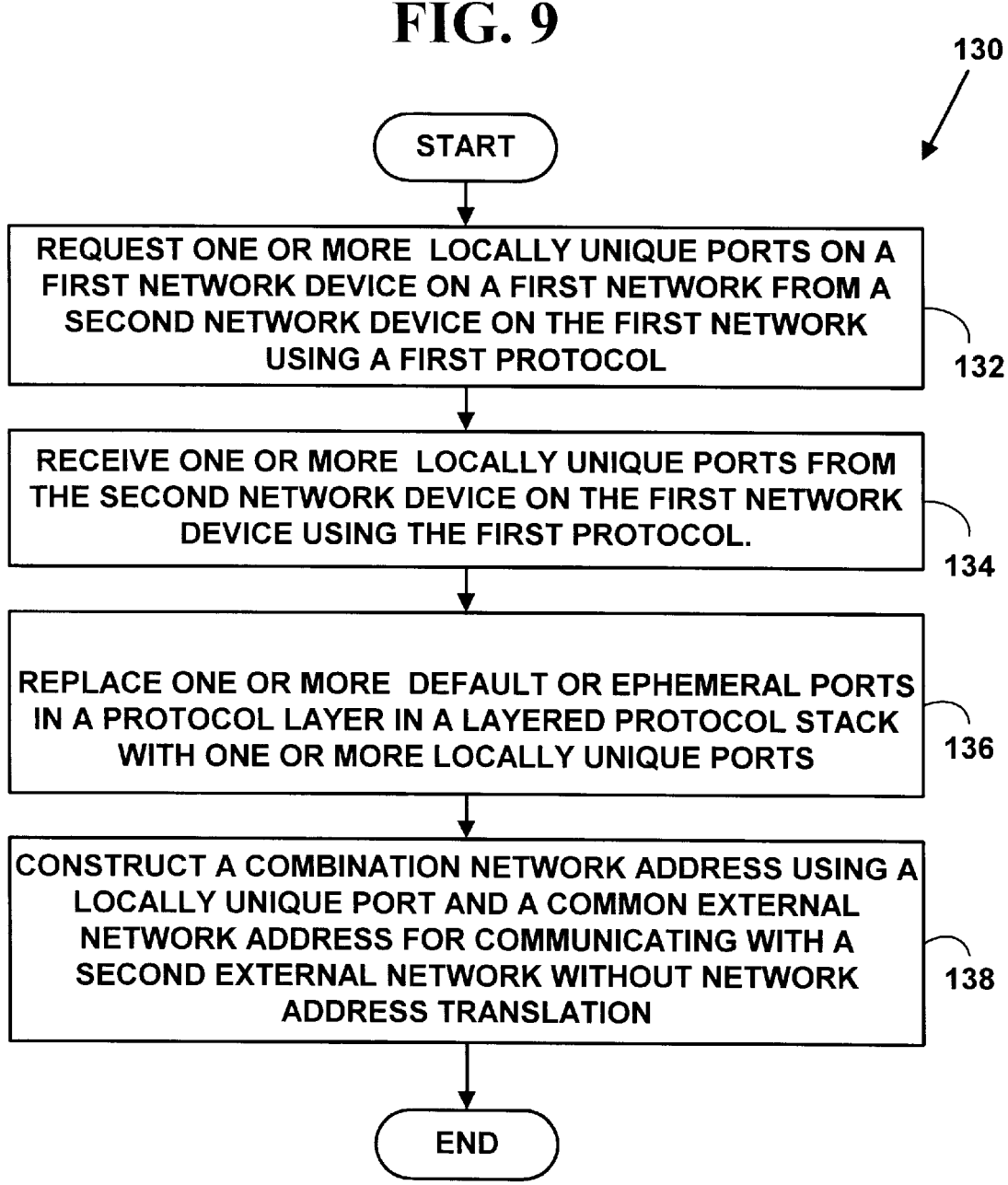
FIG. 9 is a flow diagram illustrating a method for allowing distributed network address translation.

FIG. 9 is a flow diagram illustrating a Method 130 for allowing distributed network address translation. At Step 132, a first network device on a first computer network requests one or more locally unique ports from a second network device on the first computer network with a first protocol. The locally unique ports are used to replace default or ephemeral ports in protocol layers in the layered protocol stack 42 on the first network device. In addition, the locally unique ports are used to create a combination network address 72 comprising a locally unique port and a common external address to communicate with a second external computer network without address translation. At Step 134, the first network device receives the one or more locally unique ports from the second network device. At Step 136, the first network device replaces one or more default or ephemeral ports used in the layered protocol stack 42 with one or more locally unique ports. At Step 138, the first network device constructs one or more combination network addresses 72 using the one or more locally unique ports and a common external network address used to identify the first computer network on the second external computer network.

In a preferred embodiment of the present invention, the first network device is any of network devices (14, 16, 18, 20, 22, 24), the second network device is router 26, the first computer network is first computer network 12 (e.g., SOHO LAN) the first protocol is PAP 64, the second external computer network is any of the second computer network 30 (e.g., the Internet or an intranet) or the third computer network 32 (e.g., PSTN). The combination network address 72 includes a common IP 48 address (e.g., common network address 28) identifying network devices on the first computer network 12 to a second external computer network (e.g., 30 or 32). However, the present invention is not limited to the networks, network devices, network addresses or protocols described and others may also be used.

The locally unique ports are used for entities such as protocols and applications in layered protocol stack 42 on a network device and are locally unique on the first computer network 12. The locally unique ports will identify a network device on the first computer network 12. For example, TCP 58 typically has a default port or ephemeral port assigned to the TCP 58 stack (e.g., 1234). After allocation with Method 130, a network device uses a locally unique port to replace a default or ephemeral port in a protocol layer in the layered protocol stack 42. As is illustrated in FIG. 8, the network device 14 with an internal IP 48 address, 10.0.0.1, is assigned thirty-two locally unique ports in the range of 1026–1057. The network device 14 may assign locally unique port-1032 to TCP 58 to use as a default or ephemeral port. An original default port or ephemeral for TCP 58 was 1234. The combination network address 112 illustrated in FIG. 7 is then assigned to TCP 58 on the network device 14 for communications with an external network (e.g., 30 or 32). Other locally unique ports are assigned to other protocols and applications in the layered protocol stack 42 on a network device to replace other default ports.

In one embodiment of the present invention, locally unique ports are assigned to protocol layers in the layered protocol stack 42 when a network device boots. In another embodiment of the present invention, locally unique ports are assigned to protocol layers in a layered protocol stack when a protocol layer makes a request for an external network (e.g., 30 or 32). In yet another embodiment of the present invention, locally unique ports are assigned dynamically or on-the-fly in an individual protocol layer as a protocol layer makes a request for an external network (e.g., 30 or 32).

The locally unique ports with common external network address 28 as the combination network address 112 uniquely identify an entity on a network device to an external network (e.g., 30 or 32) without translation. Network interface card device drivers 44 maintain the actual internal IP 48 address of a network device.

Locally unique-ports can also be used with the common external network address 28 (e.g., for Mobile IP). Locally unique ports help identify a mobile network device that roams away from a home network (e.g., first computer network 12) to a foreign network.

Figure 10:
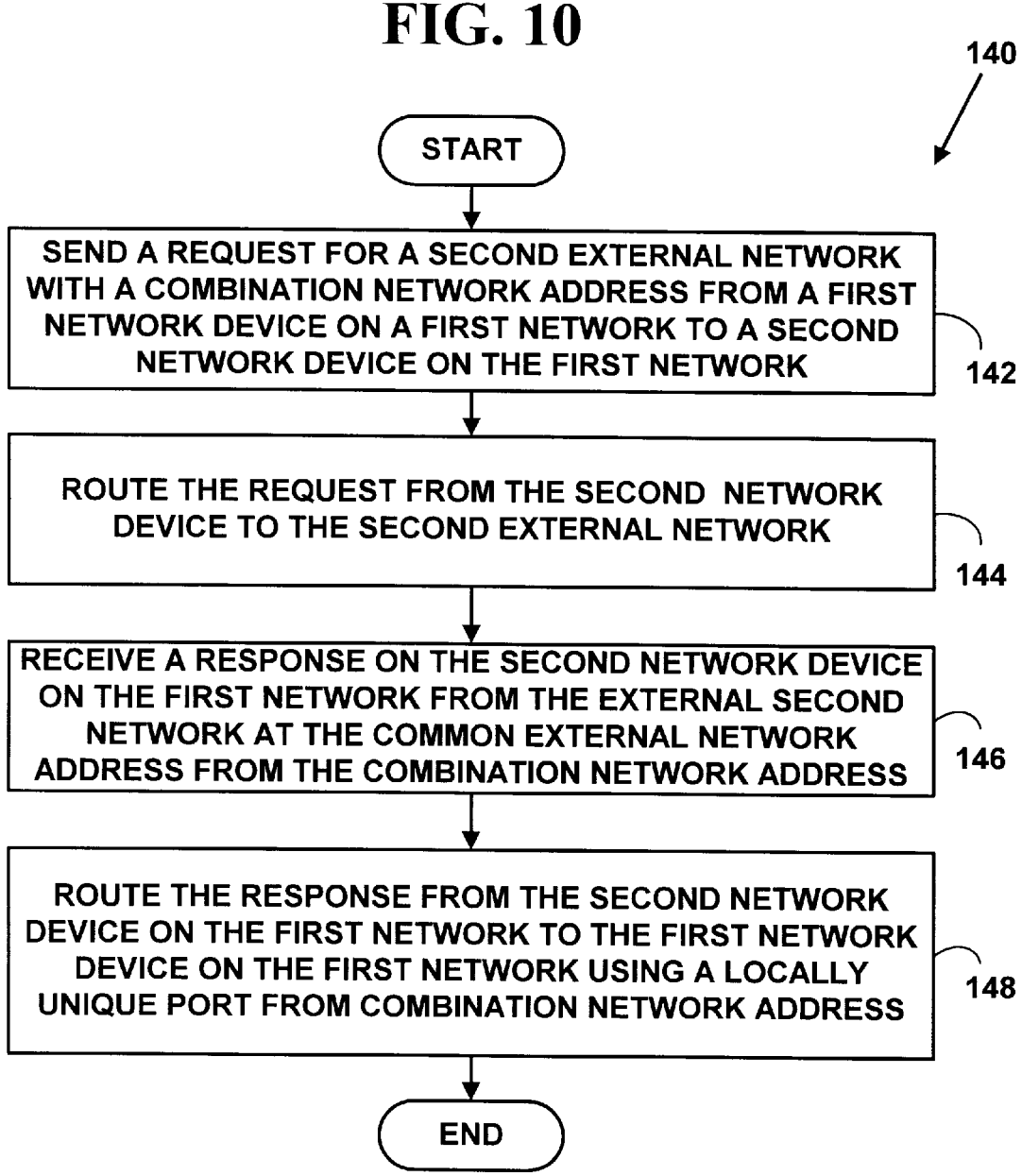
FIG. 10 is a flow diagram illustrating a method for distributed network address translation.

FIG. 10 is a flow diagram illustrating a Method 140 for distributed network address translation. At Step 142, a request is sent from a first network device on a first computer network to a second network device on the first computer network. The request is for a second external network and includes a combination network address 72 identifying the first network device on the first network. The combination network address 72 is constructed with Method 130 (FIG. 9) and includes a locally unique port and a common external address to identify the first computer network to the second external network. At Step 144, the second network device routes the request from the first computer network to the second external network. At Step 146, the second network device on the first computer network receives a response from the external second computer network at the external network address identifying the first network from the combination network address. At Step 148, the second network device on the first computer network routes the response to the first network device on the first computer network using the locally unique port from the combination network address to identify the first network device.

In a preferred embodiment of the present invention, the first network device is any of network devices (14, 16, 18, 20, 22, 24), the second network device is router 26. The first computer network is first computer network 12, and the second computer network is second computer network 30 or third computer network 32. The combination network address includes a locally unique port obtained with PAP 64 and an external IP 48 address for an external network such as the Internet, an intranet, or another computer network. However, the present invention is not limited to the networks, network devices, network address or protocol described and others may also be used.

Method 140 (FIG. 10) is illustrated with a specific example using TCP 58/IP 48 layers from the layered protocol stack 42. However, other protocol layers in the layered protocol stack 42 could also be used. At Step 142, the network device 14 sends a TCP 58 request to the server 39 (FIG. 1). For example, a TCP 58 request for server 39 at external IP 48 address, 192.200.20.3, on the second computer network 30. Table 2 illustrates an exemplary request data packet sent at Step 142.

TABLE 2

| IP 48 Header | TCP 58 Header |
|---|---|
| SRC IP: 198.10.20.30 | SRC Port: 1032 |
| DST IP: 192.200.20.3 | DST Port: 80 |

The source IP 48 address is common external network address 28 (e.g., 198.10.20.30) and the source port is a locally unique port-1032 obtained via the PAP 64 with Method 130 and available to a TCP 58 service. In one embodiment of the present invention, the locally unique port-1032 replaces default port 1234 for TCP 58 when network device 14 was booted. In another embodiment of the present invention, default port 1234 is replaced with a locally a unique port, such as locally unique port-1032, whenever a protocol layer in layered protocol stack makes the request. The locally unique port along with the common external address comprise combination network address 112.

In one preferred embodiment of the present invention, the default TCP 58 port of 1234 has been replaced with a locally unique port-1032. The destination IP address is, 192.200.20.3, for the server 39 (FIG. 1) on the second external network 30 and the destination port is well known Internet port 80. When the request reaches a network interface card device driver 44 in the layered protocol stack 42, an outer IP 48 header is added to route the request to the router 26. For example, the outer IP 48 is a virtual tunnel header that is explained below. Network interface card device drivers maintain the local internal network address (e.g., 10.0.0.x) for a network device for internal communications. Table 3 illustrates an exemplary data packet with an outer IP 48 header added for router 26.

TABLE 3

| Outer IP 48 header | Inner IP 48 header | TCP 58 header |
|---|---|---|
| SRC IP: 10.0.0.1 | SRC IP: 198.10.20.30 | SRC Port: 1032 |
| DST IP: 10.0.0.7 | DST IP: 192.200.20.3 | SRC Port: 80 |

A network interface card device driver 44 adds the outer IP 48 header including (e.g., a virtual tunnel header) a source IP 48 address for network device 14 of, 10.0.0.1, and a destination IP 48 address of, 10.0.0.7, for the router 26. At Step 144, the router 26 receives the request data packet, strips the outer IP 48 header, and sends the request data packet to the external network 30.

At Step 146, the router 26 receives a response packet from an external network (e.g., 30). An exemplary response data packet is illustrated in Table 4.

TABLE 4

| IP 48 Header | TCP 58 Header |
|---|---|
| SRC IP: 192.200.20.3 | SRC Port: 80 |
| DST IP: 198.10.20.30 | DST Port: 1032 |

The router 26 receives the response packet from the external second network 30 at Step 146 with a destination IP 48 address for the common external network address, 198.10.20.30, and a destination port set to locally unique port-1032. The router 26 uses port-to-internal network address table (FIG. 8) to map destination port-1032 to an internal IP 48 address, 10.0.0.1, for the computer 14. The router 26 adds an outer IP 48 header (e.g., a virtual tunnel header) to route the response data packet sent back to the network device 14. Table 5 illustrates an exemplary response packet with an outer IP 48 header added by the router 26.

TABLE 5

| Outer IP 48 header | Inner IP 48 header | TCP 58 header |
|---|---|---|
| SRC IP: 10.0.0.7 | SRC IP: 192.200.20.3 | SRC Port: 80 |
| DST IP: 10.0.0.1 | DST IP: 198.10.20.30 | DST Port: 1032 |

The outer IP 48 header has a source internal IP 48 address of, 10.0.0.7, for the router 26 and a destination internal IP 48 address of, 10.0.0.1, for the network device 14 on computer network 12. At Step 148, the router 26 routes the response data packet to the network device 14 with the outer IP 48 header. A network interface card device driver 44 in the layered protocol stack 42 strips the outer IP 48 header and forwards the response data packet to the network layer 46. This step can also be done in the device driver.

The network device 14 sends a request to an external network and receives a response from the external network using DNAT and locally unique port-1032 allocated with the PAP 64. The router 26 does not translate any source/destination IP 48 addresses or source/destination ports. Thus, DNAT is accomplished without network address translation at the router 26.

A preferred embodiment of the present invention is described with respect to a single common external network address identifying multiple network devices on first computer network 12 and used in combination network address 112 with a locally unique port. However, the present invention is not limited to a single common external network address and can also be practiced with a multiple common external network addresses.

Distributed network address translation using Method 130 (FIG. 9) and Method 132 (FIG. 10) removes the computation burden of NAT at the router 26 and allows multiple network devices to use a single or a small number of external network addresses known to an external network such as the Internet or an intranet. Instead of providing NAT, the router 26 routes data packets from a network device (14, 16, 18, 20, 22, 24) on the first computer network 12 to a second external computer network such as the second computer network 30 or the third computer network 32 using the combination network address. In addition, the router 26 is no longer required to support multiple application protocols from the layered protocol stack 42.

The router 26 also routes data packets from the second external computer network back to a network device on the first computer network using the locally unique port in the combination network address. The router 26 is no longer required to replace an internal network address with an external network address for outbound traffic, and replace an external network address with an internal network address for inbound traffic. Thus, DNAT of the present invention removes the computational burden of NAT from the router 26 and does not violate the Internet principal of providing end-to-end transmission of data packets between network devices without alternations.

DNAT with Port Translation

In another preferred embodiment of the present invention, DNAT is accomplished without modifying protocols or applications in the layered protocol stack 42 above the network interface device driver layer 44. However, in such an embodiment, a network interface card device driver 44 in the network devices (14, 16, 18, 20, 22, 24) is used to translate default or default ports on-the-fly to/from locally unique ports reserved by a network device with the PAP 64. In addition, the network interface card device driver 44 supports multiple protocols from the layered protocol stack 42 for DNAT with port translation.

As an example, suppose the computer 14 (FIG. 1) with an internal IP 48 address, 10.0.0.1, makes a TCP 58/IP 48 request from a server on the second computer network 32 (e.g., the Internet) at external IP 48 address, 192.200.20.3, (i.e., web server 39, FIG. 1). The initial TCP 58 packet reaching network interface card device driver 44 of layered protocol stack 42 is illustrated in Table 6.

TABLE 6

| IP 48 Header | TCP 58 Header |
| --- | --- |
| SRC IP 198.10.20.30 | SRC Port: 1234 |
| DST IP 192.200.20.3 | DST Port: 80 |

The local source port for TCP 58 is 1234, the destination port is well known port 80 for the Internet, the source IP 48 address is the common external network address 28 and the destination address is external IP 48 address for server 39 (FIG. 1).

In the preferred embodiment discussed above using Methods 130 and 140 of FIGS. 9 and 10, application and/or protocol local default ports are modified by a network device to use a locally unique port obtained via the PAP 64 in protocol layers above the device drivers. However, for DNAT with port translation, ports are not translated in the layered protocol stack 42. Network interface card device drivers instead provide port and address translation. In such an embodiment, a network interface card device driver 44 will determine that a connection is being initiated. An entry in a Source Port Translation Table ("SPTT") in a network interface card device driver 44 is created.

FIG. 11 illustrates a SPTT layout 150. However, other layouts, field sizes and values could also be used. A default-port field 152 is two-bytes and is a default or ephemeral port number used by a TCP 58 service and other applications of a network device. A translated-port 154 field is two-bytes and is a locally unique port number used for external communications allocated by PAP 64. A protocol-field 156 is one-byte and has a value of zero for TCP 58 and a value of one for UDP 60. A timestamp-field 158 is four-bytes and includes a value of a current system time in milliseconds updated every time this entry is used.

The TCP 58 source port, 1234, is translated into a locally unique port allocated by the PAP 64 by a network interface card device driver. The TCP 58 source port, 1234, is not translated in the TCP 58 layer or any other protocol layer above the network interface card device driver 44 in the layered protocol stack 42. An entry is added to SPTT 150. Table 7 illustrates an exemplary SPTT 150 table entry.

TABLE 7

| Default Port | Locally Unique Port | Protocol | Timestamp |
| --- | --- | --- | --- |
| 1234 | 1032 | 1 (TCP) | 10023 |

After translation by the network interface card driver, an outer IP 48 header is added to the data packet. The outer IP header is used for routing (e.g., through a virtual tunnel). The outer IP header has the internal address of the network device as a source IP 48 address (e.g., 10.0.0.1) and the internal network address of router 26 (e.g., 10.0.0.7) as a destination address. Table 8 illustrates the data packet with the outer IP 48 header.

TABLE 8

| Outer IP 48 Header | Inner IP 48 Header | TCP 58 Header |
| --- | --- | --- |
| SRC IP 10.0.0.1 | SRC IP 198.10.20.30 | SRC port 1032 |
| DST IP 10.0.0.7 | DST IP 192.200.20.3 | DST port 80 |

Upon receiving the data packet illustrated in Table 4, the router 26 examines the source port (e.g., 1032) and the outer IP 48 source address (e.g., 10.0.0.1 ) to ensure a network device is using a valid locally unique port assigned to the network device. Router 26 maintains an IP Address Translation Table ("IAPTT").

FIG. 12 illustrates an exemplary IAPTT layout 160. However, other layouts, field sizes and values could also be used. A destination port-field 162 is two-bytes and holds a locally unique port obtained with PAP 64. An internal destination IP address-field 164 is four-bytes and is the internal IP 48 address (e.g., 10.0.0.1) of a network device using the locally unique port in destination port-field 162. A protocol-field 166 is one-byte and has a value of zero for TCP 58 or a value of one for UDP 60. A timestamp-field 168 is four-bytes and includes a value of a current system time in milliseconds updated every time this entry is used. Table 9 illustrates an exemplary IPATT 160 table entry.

TABLE 9

| Destination Port (locally unique port) | Internal Destination IP 48 Address | Protocol | Timestamp |
| --- | --- | --- | --- |
| 1032 | 10.0.0.1 | 6(TCP) | 10048 |

Table 9 illustrates a locally unique port-1032 is associated with internal IP 48 address 10.0.0.1 (e.g., computer 14) for the TCP 58 protocol. The router 26 strips off the outer IP 48 header illustrated in Table 4 and sends the data packet comprising the inner IP 48 header and TCP 58 header to the external network 30.

A response data packet arrives from an external network on common external network address 28 (e.g., 198.10.20.30). An arriving packet contains the headers illustrated in Table 10.

TABLE 10

| IP 48 Header | TCP Header |
| --- | --- |
| SRC IP 192.200.20.3<br>DST IP 198.10.20.30 | SRC Port: 80<br>DST Port: 1032 |

The router 26 looks up the destination port (i.e., locally unique port-1032) in IPATT 158 (Table 9) and finds local network address, 10.0.0.1, (e.g., for computer 14). The router 26 then creates an outer IP 48 header such as the exemplary IP 48 header illustrated in Table 11. The outer IP 48 header has a source IP 48 address for the router 26 and a destination IP 48 address for network device 14.

TABLE 11

| Outer IP 48 Header | Inner IP 48 Header | TCP 58 Header |
| --- | --- | --- |
| SRC IP 10.0.0.7<br>DST IP 10.0.0.1 | SRC IP 192.200.20.3<br>DST IP 198.10.20.30 | SRC port 80<br>DST port 1032 |

The router 26 then transmits the data packet illustrated in Table 11 to the appropriate network device (e.g., computer 14 at internal address 10.0.0.1). Upon receiving the data packet, a network interface card driver looks up the destination port (e.g., 1032) in the SPTT 148 (e.g., Table 7) finding a mapping to TCP 58, port 1234. The locally unique port-1032 is re-translated back to TCP 58 default port 1234 in the device driver. No translation is done above the device driver. The outer IP 48 header is then stripped. The data packet is forwarded to IP 48 in the network layer 46. Table 12 illustrates the forwarded data packet.

TABLE 12

| Inner IP 48 header | TCP 58 header |
| --- | --- |
| SRC IP 192.200.20.3<br>DST IP 198.10.20.30 | SRC Port 80<br>DST Port 1234 |

The end of the connection is detected by both the router 26 and the network device 14. Upon end of connection, the entries in the SPTT 148 and IPATT 160 tables are removed from the router 26 and network interface card driver.

Figure 13:
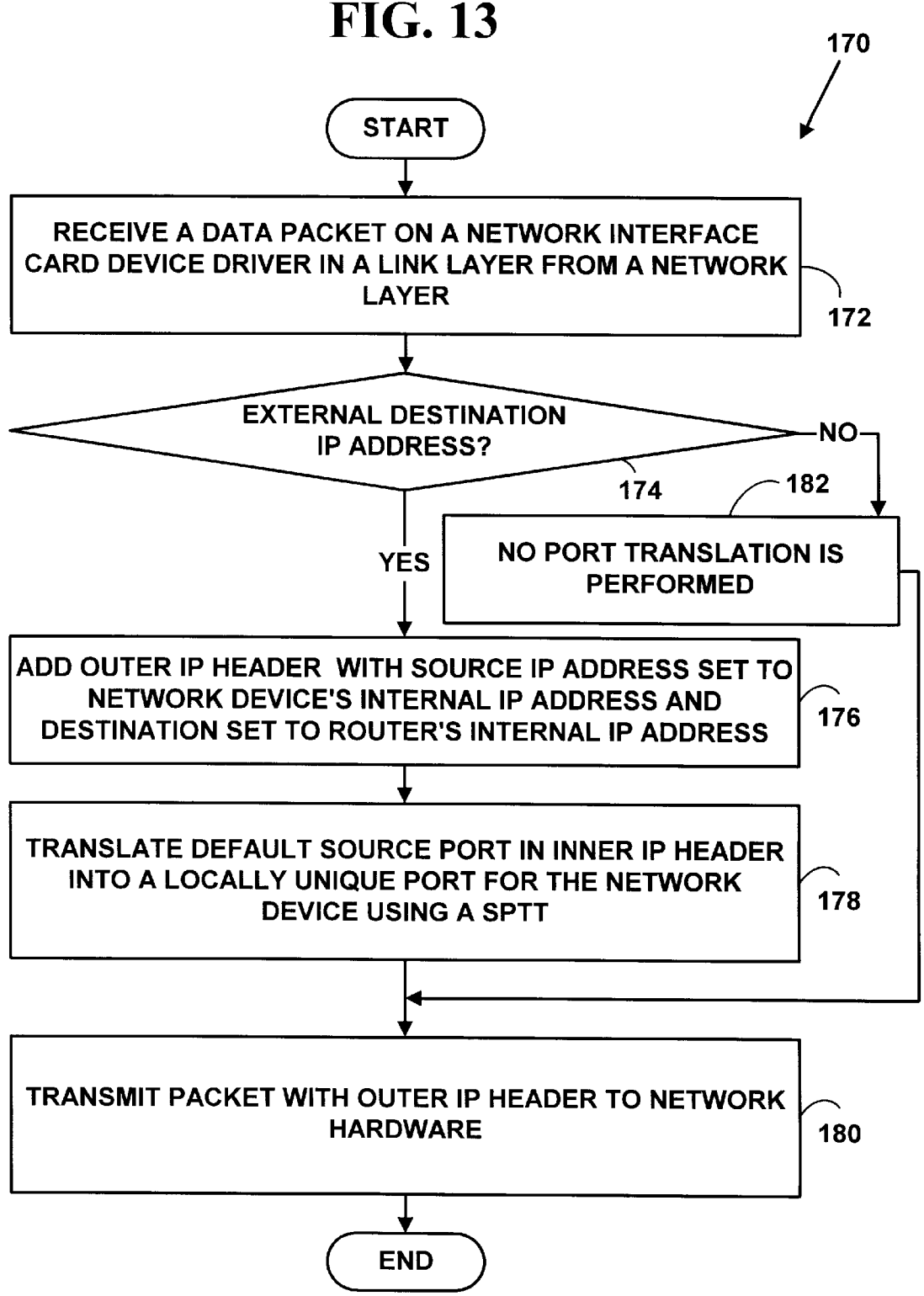
FIG. 13 illustrates a method for outbound distributed network address translation using port translation.

FIG. 13 illustrates a Method 170 for outbound distributed network address translation using port translation. At Step 172, a network interface card device driver 44 receives a data packet from the network layer 46 (e.g., Table 6). At Step 174, the network interface card device driver 44 conducts a test to determine if a destination network address (e.g., 192.200.20.3) is for an external network (e.g., 30 or 32). If so, at Step 176, the network interface card device driver 44 adds an outer IP 48 header (e.g., a virtual tunnel header) to the data packet with the source address set to the network device's internal IP 48 address (e.g., 10.0.0.1) and the destination address set to the router's 26 internal address (e.g., 10.0.0.7) as (e.g., Table 8). At Step 178, a local source port for the application or protocol from the header (e.g., TCP 58 port 1234) is translated into a locally unique port (e.g., 1032) obtained via PAP 64 with SPTT 150 (e.g., Table 7). At Step 180, the data packet with the outer IP 48 header is transmitted to network interface card hardware, which forwards to data packet to the router 26.

If the test at Step 174 determines that the destination network address is for internal network 12, then at Step 182, the default or ephemeral source port is not translated to a locally unique port for internal communications. Using Method 170, distributed network address translation is done by a network interface card device driver, and no port translation occurs above device driver. However, other software or hardware modules or drivers besides network interface card device driver 44 could also translate ports with Method 170.

Figure 14:
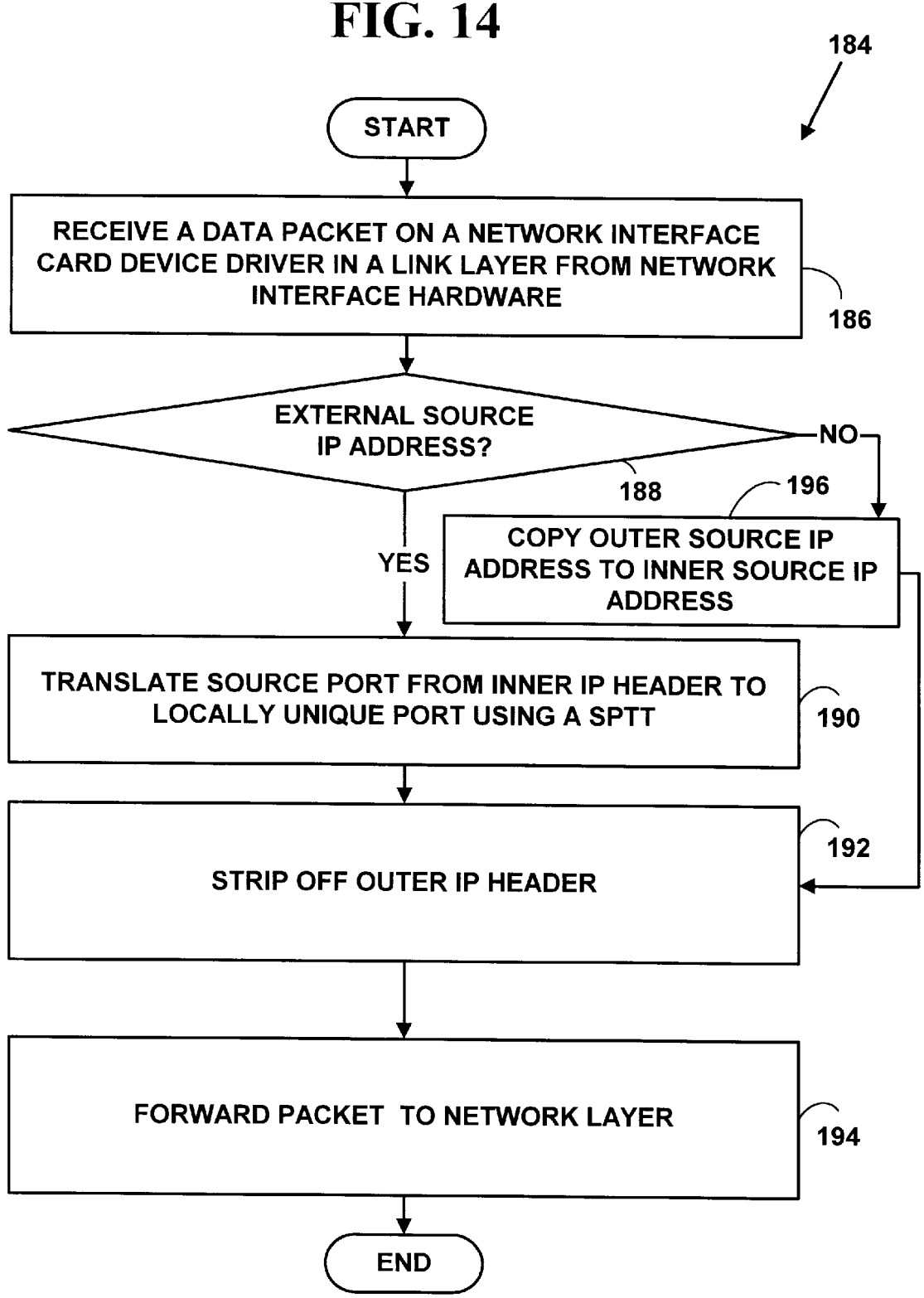
FIG. 14 illustrates a method for inbound distributed network address translation using port translation.

FIG. 14 is a flow diagram illustrating a Method 184 for inbound distributed network address translation using port translation. At Step 186, a data packet is received on a network interface card driver 44 (e.g., Table 11) from the router 26. The router 26 received the data packet from external network 30 or 32 and added an outer IP 48 header. At Step 188, a test is conducted to determine if the source IP 48 address from the inner IP 48 header is an external IP 48 address. If so, at Step 190 the destination port from the inner EP 48 header is translated from a locally unique port to a default port (e.g., 1032→1234) using the SPATT 158 (Table 7). At Step 192, the outer IP 48 header is stripped off. At Step 192, the data packet (e.g., Table I 2) is forwarded to the network layer 46.

If the test at Step 188 determines that the source IP 48 address is for the internal network 12, then at Step 196 the source IP 48 address from the outer IP 48 header is copied to the inner source EP 48 address. At Step 192, the outer IP 48 header is stripped off. At Step 194, the data packet is forwarded to network layer 46. The default or local source port is not translated to a locally unique port for internal communications.

Using Method 184, distributed network address translation is done by a network interface card device driver, and no port translation occurs above the device driver. However, other software or hardware modules or drivers besides a network interface card device driver, or in layers above the network interface card device driver 44 could also translate ports with Method 184.

DNAT (FIG. 9 and FIG. 10) does port translation in individual protocol layers in the layered protocol stack 42. The port translation is done at boot time for a network device, or dynamically in a protocol layer when a protocol layer makes a request to an external network (e.g., 30 or 32).

In contrast, DNAT with port translation (FIG. 13 and FIG. 14) does port translation in the network interface card device driver 44 on a network device. No ports are translated in protocol layers above the device driver. In addition, the network interface card device driver 44 supports multiple protocols from the layered protocol stack 42 above the network interface card device driver 44 for DNAT with port translation. For outbound data, a default port assigned to an application or protocol is translated to a locally unique port "on-the-fly" in the device driver. For inbound data, the network device translates a locally unique port back to a default port on-the-fly in the device driver. DNAT with on-the-fly port translation in the network interface card device driver 44 (FIGS. 13 and 14) places more computational overhead on a network device than DNAT with port translation in individual protocol layers (FIG. 10).

However, DNAT with on-the-fly port translation in the network interface card device driver 44 (FIGS. 13 and 14) is still preferred over non-distributed NAT in the router 26 with Methods known in the art since computational costs for translation are distributed among a number of network devices and not concentrated in the router 26. The router 26 does not translate any addresses for the described embodiments of the present invention. The method and protocol for distributed network address translation described above can also be used with protocols that provide security for a network using IP 48.

Internet Protocol Security

There are a number of security measures that can be used with IP 48. One or more security measures can be indicated in an IP 48 header. Internet Protocol security processing is confined completely within the IP 48 layer. All DNAT processing, when used with Internet Protocol security must run above the IP 48 layer. Otherwise, Internet Protocol security parameters are violated.

FIG. 15 is a block diagram illustrating an IP 48 packet header 200. A version-field 202 includes an IP 48 protocol version (e.g., IPv4 or IPv6). An Internet Header Length ("IHL")-field 204 includes a length for the header. A Type-of-Service ("ToS")-field 206 includes a requested type of service. A total length-field 208 includes a length of everything in an IP 48 data packet including the IP 48 header 200. An identification-field 210 is used with packet fragmentation. A fragment offset field 212 is also used with packet fragmentation. A Time-To-Live ("TTL")-field 214 is now a hop count used to limit a lifetime for an IP 48 packet included with the header. A protocol-field 216 includes a protocol used with the IP 48 packet 200 (e.g., TCP 58, UDP 60, ESP, AH, etc.). A header checksum-field 218 is used to verify the contents of the IP 48 packet header 200. A source address-field 220 includes a source IP 48 address for a sending endpoint A destination address-field 222 includes an IP 48 address for a receiving endpoint. An options-field 224 is used for security, source routing, error reporting, debugging, time stamping, and other information. IP 48 data (e.g., TCP 58, UDP 60, etc.) appears below the options-field 224.

Internet Protocol security ("IPsec"), provides security for IP 48 packets. For more information in IPsec see "Security Architecture for the Internet Protocol", by S. Kent and R. Atkinson, RFC-2401, November, 1998, incorporated herein by reference. Three security requirements are typically addressed by IPsec. LPsec provides message authentication, integrity and confidentiality for IP 48 packets moving between a source and a destination endpoint Starting from a state in which no connection exists between two endpoints, a Security Association ("SA") can be established based upon IP 48 such that each endpoint trusts the security of the connection, and an identity of each endpoint is authenticated to the other.

IPsec typically defines two security services, each having an associated header that is added to an IP 48 packet that it protects. The two security services are an Authentication Header ("AH") and an Encapsulating Security Payload ("ESP") header. However, more or fewer security services can also be used with IPsec.

The AH provides authentication and integrity protection for IP 48 packets. For more information on the AH see, "IP Authentication Header," by S. Kent and R. Atkinson, RFC-2402, November, 1998, incorporated herein by reference.

The ESP provides encryption protection as well as optional authentication and integrity protection. For more information on the ESP see, "IP Encapsulating Security Payload (ESP)," by S. Kent and R. Atkinson, RFC-2406, November, 1998, incorporated herein by reference.

The IPsec protocol headers are identified in the protocol-field 216 of an IP packet header 200 (FIG. 15). An IPsec protocol header specifies a protocol type (i.e., AH or ESP) and contains a numerical value called the Security Parameter Index ("SPI"). The SPI is a unique identifier associated with a SA by a receiving endpoint. The identifying information is used by a receiving endpoint to help it correctly associate an IP 48 packet with a SA. Correct association of an IP 48 packet with a SA is required in order to apply proper IPsec processing.

The IPsec services can be applied in one of two modes, a "transport mode" or a "tunnel mode." In the transport mode, a packet is routed directly to its final destination according to a destination address (e.g., IP 48 destination address 222 (FIG. 15)). A final destination is where the IPsec processing is done, as well as where the IP 48 packet is "consumed," (i.e., processed). The destination IP 48 address is "visible" (i.e., not encrypted) as the IP 48 packet traverses the network.

As is known in the art, a virtual tunnel can be created by encapsulating a data packet inside another data packet. For example, an outer header is added before an inner header of a data packet (e.g., Tables 3, 5, 8 and 11). Between the inner header and outer headers are any other headers for a data path, or security, such as security headers specific to a tunnel configuration. The outer header typically identifies the "endpoints" of the tunnel. The inner header typically identifies an original sender and recipient of the data For more information, see "IP-in-IP tunneling," by W. Simpson, RFC-1853, October 1995, incorporated herein by reference.

In the tunnel mode, an outermost tunnel IP 48 header encapsulates a protected IP packet A first destination address is an endpoint of a tunnel according to a tunnel destination address. A final destination address is not necessarily the same as an endpoint address of the tunnel. A destination IP 48 address 222 (FIG. 15) in the IP 48 header of the encapsulated (i.e., encrypted) part may or may not be "visible."

IPsec protocols establish and use a Security Association ("SA") to identify a secure virtual connection between two endpoints. A SA is a unidirectional connection between two endpoints that represents a single IPsec protocol-mode combination. Two termination endpoints (i.e., network devices for the transport mode, or intermediate devices for the tunnel mode) of a single SA define a secure virtual connection that is protected by IPsec services. One of the endpoints sends IP 48 packets, and the other endpoint receives them. Since a SA is unidirectional, a minimum of two SAs are required for secure, bi-directional communications. It is also possible to configure multiple layers of IPsec protocols between two endpoints by combining multiple SAs.

Figure 16:
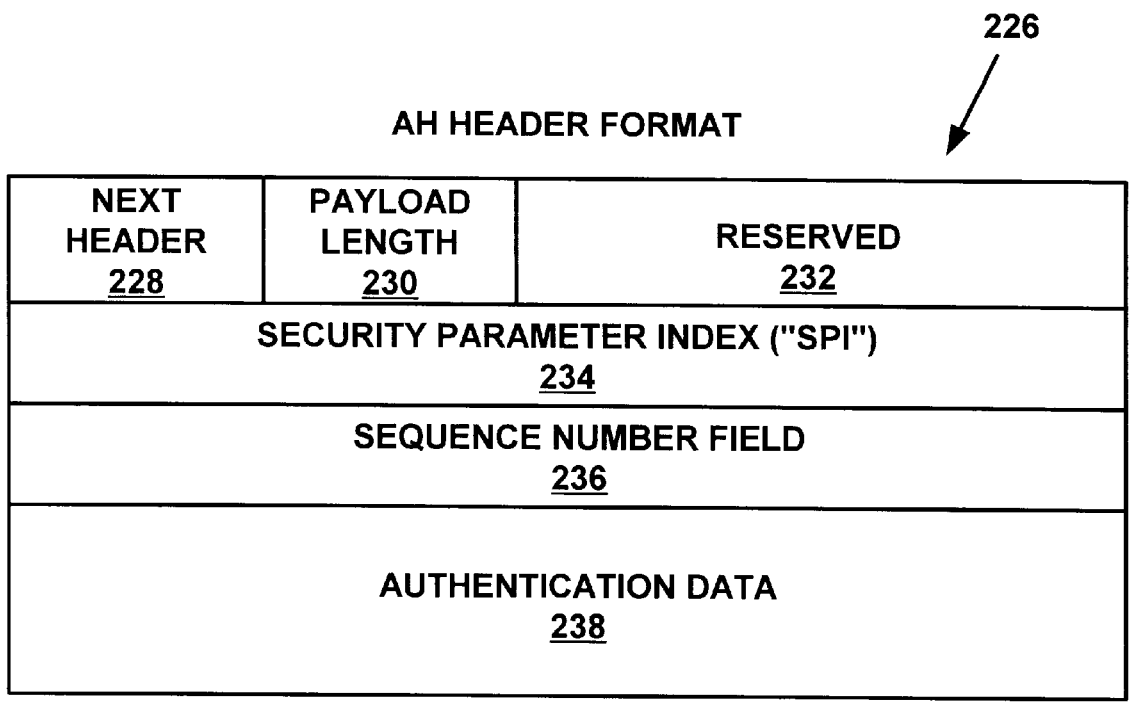
FIG. 16 is a block diagram illustrating an Internet Protocol security Authentication Header format.

FIG. 16 is a block diagram illustrating an Internet Protocol security Authentication Header 226. A next header-field 228 is an 8-bit field that identifies the type of the next payload after the AH. A payload length-field 230 specifies the value of an AH in 32-bit words (i.e., 4-bytes). A reserved-field 232 is a 16-bit field reserved for future use. A Security Parameters Index ("SPI")-field 234 is an arbitrary 32-bit value that, in combination with a destination IP 48 address and a security protocol (e.g. AH or ESP), uniquely identify a SA for the data packet A set of SPI values are in the range of 1 through 255 are reserved by the Internet Corporation for Assigned Names and Numbers ("ICANN") for future use. More information on ICAN-N can be found at the URL "www.icann.org." A SPI greater than 255 is selected by a destination endpoint upon establishment of a SA. Allocation of SPI using the PAP 64 is explained below. A sequence number-field 236 is an unsigned 32-bit field including a monotonically increasing counter value as a sequence number. An authentication data-field 238 is a variable length field that contains an Integrity Check Value ("ICV") for a packet.

In the transport mode, a sending endpoint inserts an AH header after an IP 48 header and before an upper protocol layer (e.g., TCP 58, UDP 60, etc.). In the tunnel mode, outer and inner IP header/extensions can be used in a variety of ways. Placement of the AH header in the tunnel mode is dependent on a variety of factors including the type of tunneling used. Thus, a location for an AH header may vary.

For outbound packets, AH is applied after an IPsec application determines that a packet associated with a SA wants AH processing. A sending endpoint's AH sequence number-field 236 (FIG. 16) is initialized to zero when a SA is established. The sending endpoint increments the sequence number-field 236 for a SA. Thus, a first AH packet using a given SA will have a sequence number of 1. An AH ICV used in the authentication data-field 238 (FIG. 16) is computed over IP header fields 200 (FIG. 15) that are either immutable in transit, or are predictable in value upon arrival at an endpoint for the AH SA. The AH header 226 (FIG. 16) and explicit padding bytes, if any, are computed after the IP 48 header 200 fields (FIG. 15). Upper level protocol data (e.g., TCP 58, UDP 60), which is assumed to be immutable in transit is computed last. If required, IP 48 fragmentation occurs after AH processing using an IPsec implementation.

For inbound packets, packet reassembly is performed prior to AH processing. Upon receipt of a packet containing an AH, a receiving endpoint determines an appropriate SA, based on a destination IP 48 address 222 (FIG. 15), a AH protocol header 226 (FIG. 16), and an AH SPI 234 (FIG. 16). A sequence number is verified next The sequence number helps prevent replay attacks. An ICV value is computed over appropriate fields of the packet, using a specified authentication algorithm, and verifies that it is the same algorithm as the ICV included in the authentication data-field 238 of the AH header 226 (FIG. 16).

Figure 17:
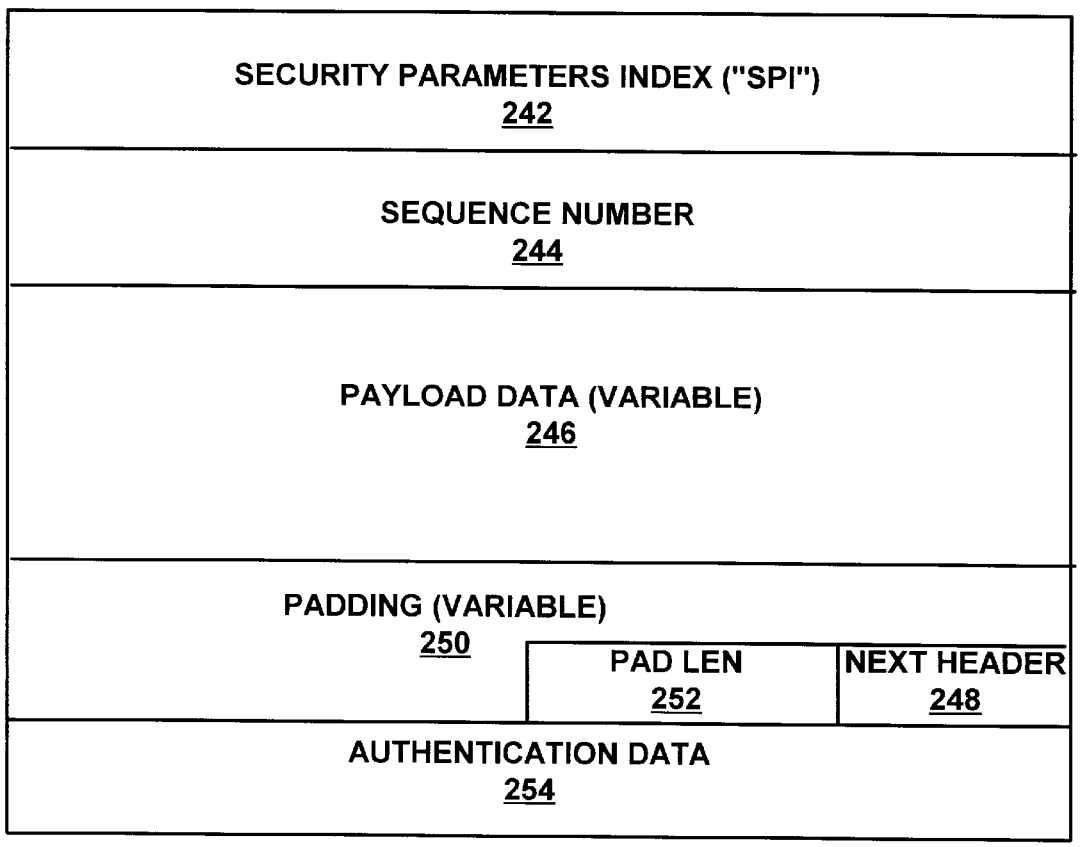
FIG. 17 is a block diagram illustrating an Encapsulating Security Payload packet format.

FIG. 17 is a block diagram illustrating an ESP packet format 240. A SPI-field 242 is an arbitrary 32-bit value that, in combination with a destination IP 48 address and a security protocol (e.g. AH or ESP), uniquely identify a SA for the data packet. A sequence number-field 244 is a 32-bit field that includes a monotonically increasing counter value as a sequence number. A payload data-field 246 is a variable length field including data described by the next header field 248. A padding-field 250 is used with the payload data-field 246 for encryption. A pad length-field 252 indicates a number of pad bytes immediately preceding it. A next header-field 248 is an 8-bit field that includes a type of data contained in the payload data-field 246. An authentication data-field 254 is a variable length field including an Integrity Check Value ("ICV") computed over the whole ESP header 240 minus the authentication data-field 254.

In the transport mode, a sending endpoint encapsulates upper layer protocol information in an ESP header and trailer and retains an original IP 48 header. In the tunnel mode, the outer and inner IP 48 headers/extensions can be inter-related in a variety of ways depending on the encryption being used. Thus, a location for the ESP may vary.

For outbound packets, ESP is applied after an IPsec application determines that a packet associated with a SA wants ESP processing. The sending endpoint encapsulates into the ESP payload data-field 246 (FIG. 17) and original upper layer protocol information for the transport mode using a selected encryption technique. An entire IP 48 data packet is encapsulated for the tunnel mode. Any necessary padding is added to the padding-field 250. The payload data-field 246, the next header-field 248, the padding-field 250, and the padding length-field 252 are encrypted with an encryption technique. The exact steps used for constructing an outer IP 48 header depend on the mode (e.g., transport or tunnel) and the encryption technique being used A sending endpoint's sequence number-field 244 is initialized to zero when a SA is established. The sending endpoint increments the sequence number field 244 for a SA. Thus, a first ESP packet using a given SA will have a sequence number of 1. If authentication is selected for the SA, the sending endpoint computes an ICV over the whole ESP header 240 minus the authentication data-field 254. If necessary, fragmentation is performed after ESP processing with an IPsec implementation.

For inbound packets, packet reassembly is performed prior to ESP processing, if necessary. Upon receipt of an IP 48 packet including an ESP header 240, a receiving endpoint determines the appropriate SA based on a destination IP address 222 (FIG. 15), ESP protocol header 240 (FIG. 17), and a SPI 242 (FIG. 17). The SA indicates whether the sequence number-field 244 will be checked, whether the authentication data-field 254 should be present, and what encryption techniques should be used for decryption and ICV computations, if necessary. During decryption, the ESP payload data-field 246, next header-field 248, the padding-field 250, and the padding length-field 252 are decrypted using a key, decryption technique, and cryptographic synchronization data if any, indicated by the SA. Any padding from the padding-field 250 is processed if necessary. An original IP 48 packet is reconstructed including an original IP 48 header 200 (FIG. 15) plus original upper layer protocol information for the transport mode in the ESP payload data-field 246 (FIG. 17). A tunnel IP 48 header and an entire IP 48 packet is reconstructed in the ESP payload data-field 246 for the tunnel mode. The exact steps for reconstructing the original IP 48 packet depend on the mode (i.e., transport or tunnel).

Figure 18:
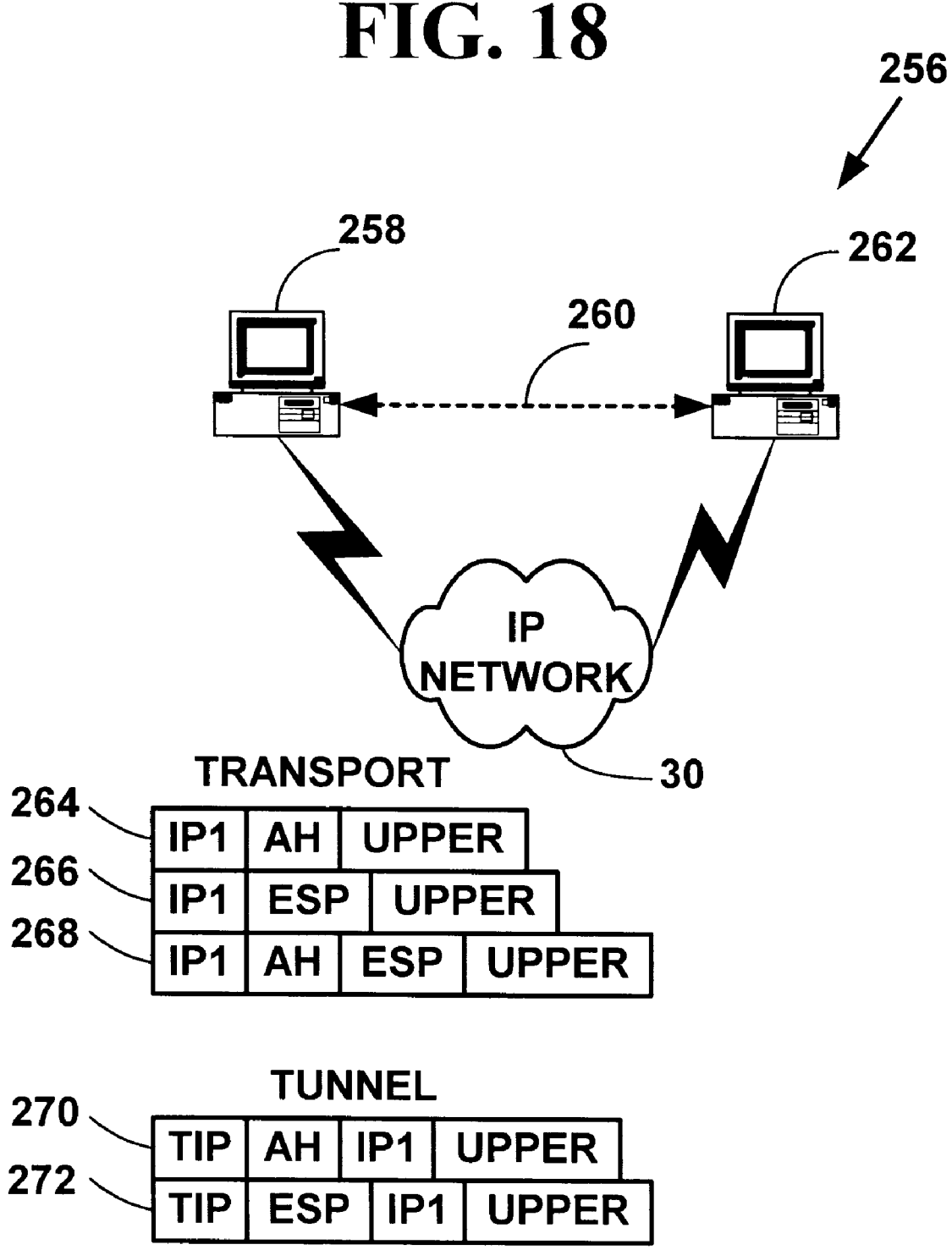
FIG. 18 is a block diagram illustrating end-to-end security between two endpoints over an Internet Protocol network.

FIG. 18 is a block diagram illustrating end-to-end security 256 between two endpoints across an IP 48 network 30 (e.g., the Internet or an intranet) using AH, ESP and combinations thereof, in the transport and tunnel modes. A first end point 258, has a secure connection 260 to a second endpoint 262. A first exemplary data packet 264 includes a first IP 48 address ("IP1") in a first IP 48 header, an AH header and upper level protocol data. A second exemplary data packet 266 includes a first IP 48 address, an ESP header and upper level protocol data. A third exemplary data packet 268 includes a first IP 48 address, an AH header, an ESP header, and upper level protocol data. The exemplary data packets 264, 266 and 268 are used in the transport mode. One type of data packet layouts is typically selected (264, 266, or 268) for the transport mode depending on the type of security desired.

In the tunnel mode, a fourth exemplary data packet 270 includes a tunnel IP 48 header with a tunnel IP address ("TIP"), an AH header, an original IP 48 header with a first IP 48 address ("IP1") and upper level protocol data. A fifth exemplary data packet 272 includes a tunnel IP 48 header with a tunnel IP 48 address, an AH header, an original IP 48 header with a first IP 48 address and upper level protocol data. One type of exemplary data packet 270 or 272 is typically selected for the tunnel mode depending on the security desired. A combination of AH and ESP in the tunnel mode is not typically used and is not illustrated in FIG. 18. However, a combination of AH and ESP may be also be used in the tunnel mode with the present invention.

A set of protocols has been developed to allow two endpoints to establish one or more SAs between them. The process of establishing an IPsec SA involves both negotiation and authentication. The negotiation results in an agreement between the two endpoints as to which security protocol and mode to use, as well as specific encryption techniques, associated parameter values, and SPI assignment for each SA that was established. The authentication ensures that each endpoint can trust the identity of the other endpoint during negotiation, and hence after the SA is established.

A number of standards have been proposed for protocols that establish SAs including an Internet Security Association and Key Exchange Protocol ("ISAKMP"), an Oakley Protocol ("Oakley"), and the Internet Key Exchange ("IKE") protocol, which incorporates ISKCMP and Oakley. For more information on ISAKMP see, "Internet Security Association and Key Management Protocol ("ISAKMP")," by D. Maughan, M.Schertler, M. Schneider and J. Turner, RFC-2408, November, 1998, incorporated by reference. For more information on Oakley see, "The OAKLEY Key Determination Protocol," by H. K. Orman, RFC-2412, November, 1998, incorporated herein by reference. For more information on IKE see, "The Internet Key Exchange (IKE)," by D. Harkins and D. Carrel, RFC-2409, November, 1998, incorporated herein by reference.

Using ISAMKP and IKE, SA negotiation is carried out as a sequence of signaling exchanges between two endpoints. A first endpoint proposes a security protocol and encryption algorithm, and a second endpoint accepts or counter-proposes. Once the signaling is complete both endpoints have agreed to negotiated details, relevant security parameter information is exchanged and the endpoints are ready to send or receive on a single unidirectional SA. Part of the signaling includes exchange of authentication information, using a CA. This is described below.

Authentication is based on a trusted third-party called a Certificate Authority ("CA"). Each endpoint that participates in IPsec generates a public/private encryption key pair, and has its public key "notarized" by the CA. The CA binds an endpoint's IP 48 address to its public key, generates a certificate and returns it to an owner of the key. Thus, IP 48 addresses are one "security name space" used for binding public keys to their owners.

During SA negotiation, one endpoint supplies another endpoint with its certificate along with a signature that is encrypted with its private key. The certificate and signature are verified with a public key. A recipient (one at each endpoint) uses a sender's public key from its certificate to validate the signature and the sender's right to use its IP 48 address. Since only the sender has access to the private key, the recipient, once it has verified the signature, is certain of the initiator's "identity." In one exemplary preferred embodiment of the present invention, the identity is determined by the IP 48 address of the initiator, as IP 48 addresses form the security name space used to bind public keys to their owners. However, other security name spaces could also be used using other than an IP 48 address for an initiator's identity. Certificates are issued with a "Time-to-Live" value, after which they expire and become invalid. The result of negotiation and authentication is a secure connection 260 (FIG. 18) for one unidirectional SA. A second SA for bi-directional communications may be registered in a similar manner.

As was discussed above, NAT routers known in the art need to modify IP 48 packets. However, once an IP 48 packet is protected by IPsec, it cannot be modified anywhere along its path to the IPsec destination. NAT routers known in the art typically violate IPsec by modifying packets. In addition, even if a NAT router did not need to modify the packets it forwards, it must be able to read the TCP 58 or UDP 60 port numbers. If ESP is used by a local endpoint, the port numbers will be encrypted, so the NAT router will not be able to complete its required mapping.

Local network devices on a LAN that use NAT possess only local, non-unique IP 48 addresses. These do not comprise a security name space that is suitable for binding a public key to a unique identity (i.e., a unique global IP 48 address). Without this binding, it is typically not possible to provide the authentication necessary for establishment of SAs. Without authentication, neither endpoint can be certain of the identity of their counter part, and thus cannot establish a secure and trusted connection via a SA. However, DNAT described above, can be used with IPsec to overcome some of the problems with NAT devices known in the art.

Distributed Network Address Translation and Internet Protocol Security

A network device using DNAT as described above may also desire to establish a secure virtual connection to an external network device using IPsec (e.g., SPIs). Such a network device would request and use locally unique ports and use DNAT as was described above. In addition, the network device may request locally unique security values to use DNAT with IPsec.

Figure 19:
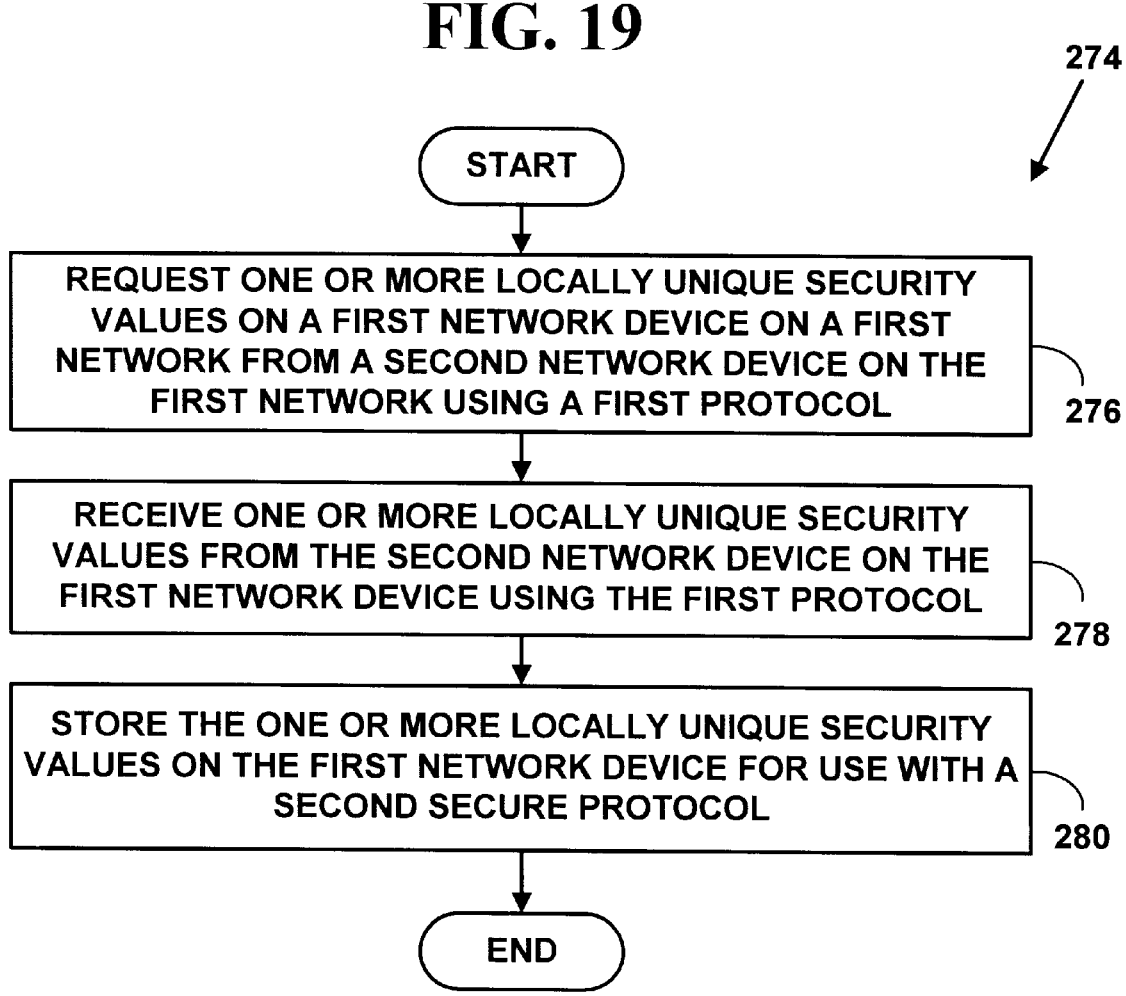
FIG. 19 is a flow diagram illustrating a method for distributed network address translation with security.

FIG. 19 is a flow diagram illustrating a Method 274 for distributed network address translation with security. At Step 276, a first network device on a first computer network requests with a first protocol, one or more locally unique security values (e.g., SPIs) from a second network device on the first computer network and for distributed network address translation. The one or more locally unique security values are used to identify security associations for data reception on the first network device during secure communications with a third network device on a second external network. At Step 278, the one or more locally unique security values are received on the first network device from the second network device with the first protocol. The one or more locally unique security values are stored on the first network device at Step 280. The one or more locally unique security values can be used to identify a unique security association for secure communications and used for distributed network address translation. A unique security association identified by the first computer on the first network is used for reception of packets on the first computer.

In one exemplary preferred embodiment of the present invention, the first network device is a network device (14, 16, 18, 20, 22, and 24), the second network device is the router 26, the first protocol is the PAP 64, the one or more locally unique security values are SPIs used with IPsec, including AH or ESP. In one exemplary preferred embodiment of the present invention, the locally unique security values are obtained with the PAP 64 using a PAP 64 security request message 67, a PAP 64 security response message 69, and a PAP 64 security invalidate message 71.

Figure 4A:
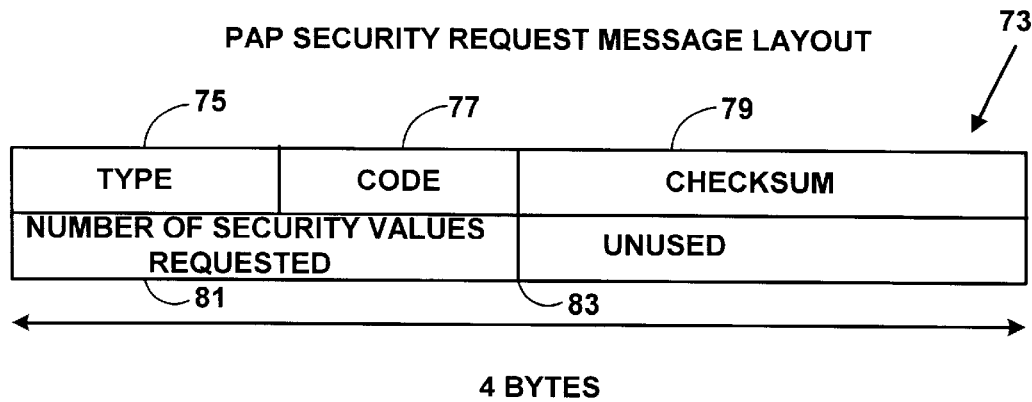
FIG. 4A is a block diagram illustrating a PAP security request message layout.
Figure 5A:
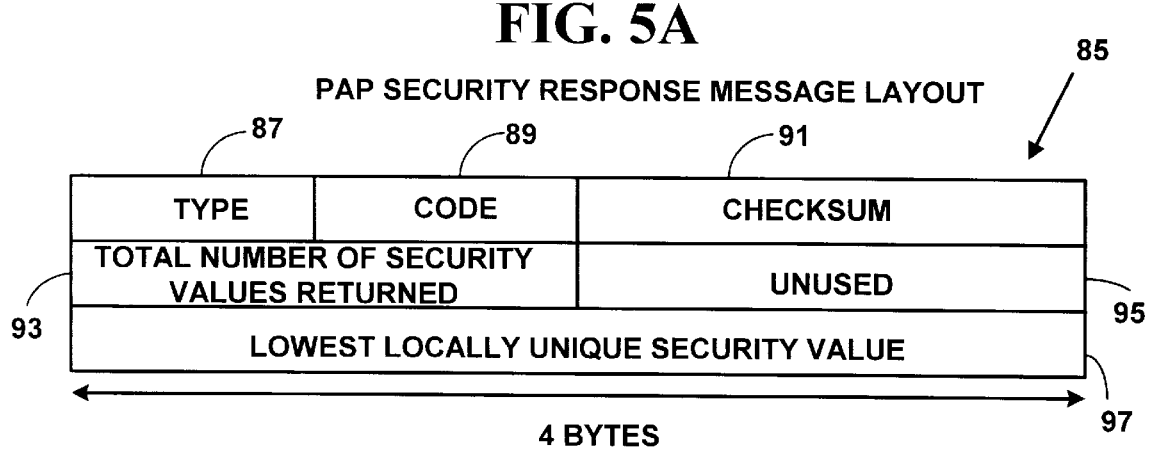
FIG. 5A is a block diagram illustrating a PAP security response message layout.
Figure 6A:
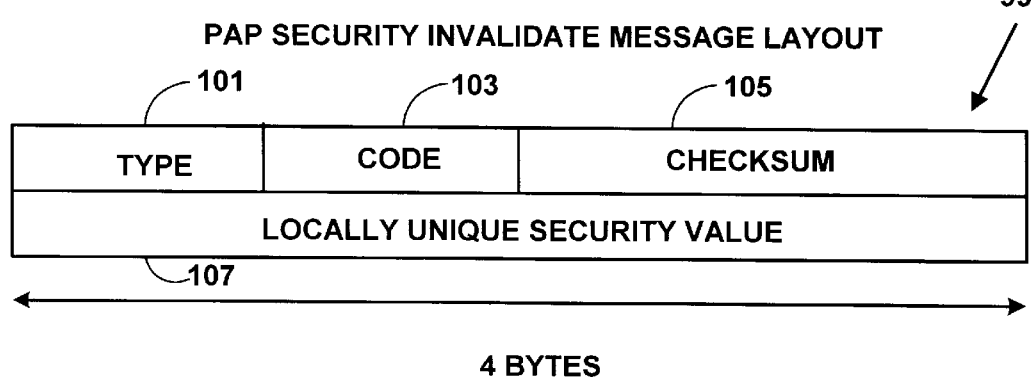
FIG. 6A is a block diagram illustrating a PAP security invalidate message layout.

FIGS. 4A, 5A, and 6A illustrate exemplary PAP 64 security request message 67 layout 73, a PAP 64 security response message 69 layout 87, and a PAP 64 security invalidate message 71 layout 99. The PAP 64 security messages are used to allocate and de-allocate locally unique security values (e.g., SPIs) and are similar to the PAP 64 messages used to allocate locally unique security values.

FIG. 4A is a block diagram illustrating a PAP security request message 67 layout 73. A type-field 75 is one-byte and has a value (e.g., 33) for requesting locally unique security values. A code-field 77 is one-byte and has a value of zero for locally unique security values. A checksum-field 79 is two-bytes, and has a value of a 1's complement sum of the entire PAP security request message layout 73. The security values-requested-field 81 is two-bytes and has a variable value indicating a number of locally unique security values requested by a network device. Unused-field 83 is two-bytes and has a value of zero. However, other layouts, values and field sizes could also be used for the PAP security request 67 message layout 73.

FIG. 5A is a block diagram illustrating a PAP security response message 69 layout 85. A type-field 87 is one-byte and has a value for receiving security responses (e.g., 33). A code-field 89 is one-byte and has a value of zero for failure and one for success. A checksum-field 91 is two-bytes and is a 16-bit 1's complement sum of the entire PAP security response message 85. A total-security-value-field 93 is two-bytes and is the total number of locally unique ports allocated to the network device. An unused-field 95 is two-bytes and has a value of zero. A lowest-unique-security-value-field 97 is four-bytes and includes a lowest locally unique security value allocated in a block of locally unique security values. However, other layouts, values and field sizes could also be used for the PAP security response message 85.

FIG. 6A is a block diagram illustrating a PAP security invalidate message 71 layout 99. A type-field 101 is one-byte and has a value to de-allocate security values (e.g., 33). A code-field 103 is one-byte and has a value of two. A checksum-field 105 is two-bytes and is a 1's complement sum of the entire PAP security invalidate message 99. A security-value-field 107 is four-bytes and has a value of a locally unique security value used by the network device that is being invalidated or de-allocated. However, other layouts, values and field sizes could also be used for PAP security invalidate message 99.

Returning to FIG. 19, the first network device, such as a computer 14, uses a PAP 64 security request message 67 to request the locally unique SPIs, and receives the SPIs in a PAP 64 security response message 69. The locally unique SPIs are requested, received and stored in a manner similar to the locally unique DNAT ports described above. However, the present invention is not limited to this exemplary preferred embodiment, and other network devices, protocols and security values could also be used. In one exemplary preferred embodiment of the present invention, the second network device allocates the one or more locally unique security values used on the first network device.

Figure 20:
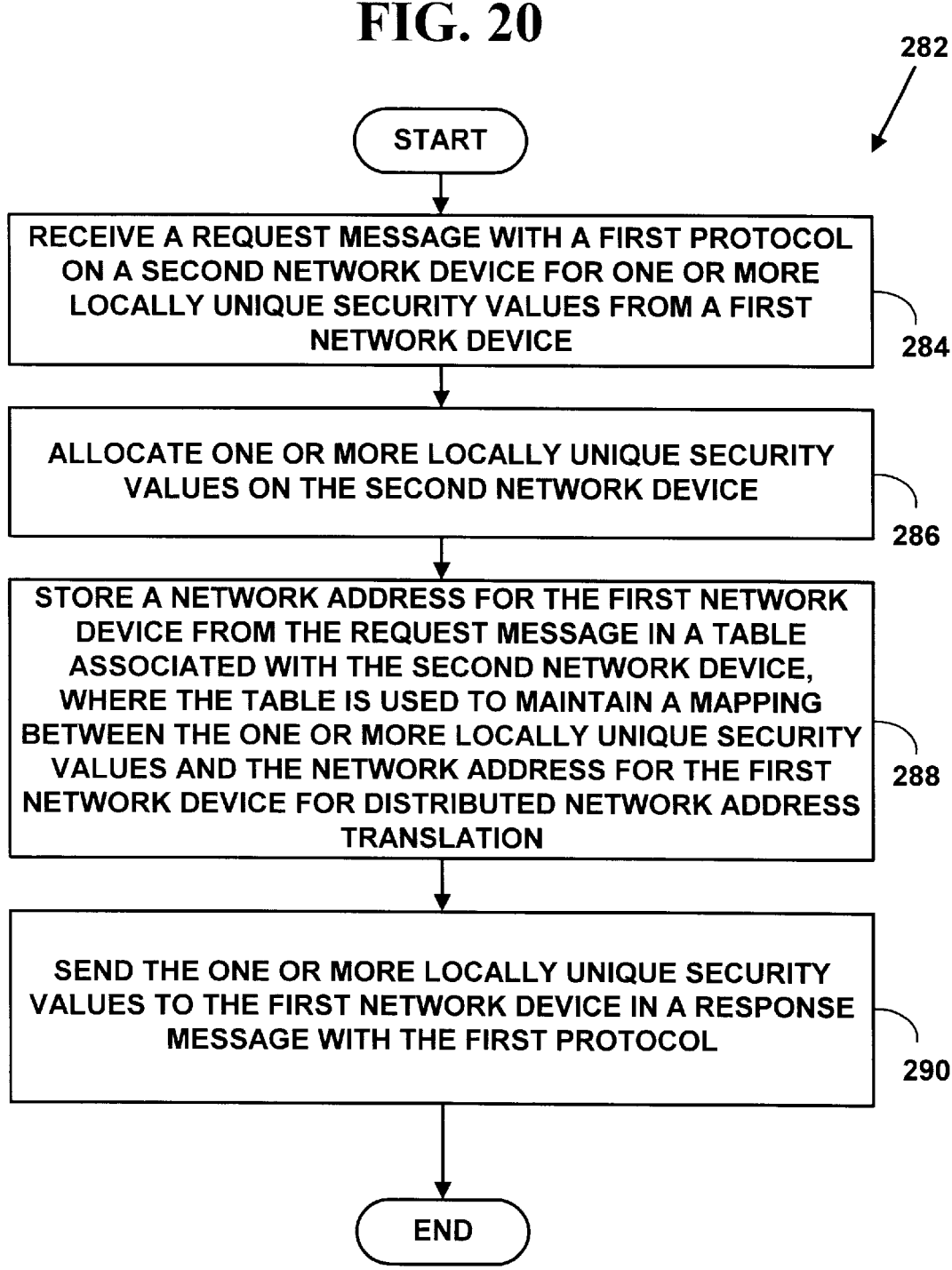
FIG. 20 is a flow diagram illustrating a method for distributed network address translation with security.

FIG. 20 is a flow diagram illustrating a Method 282 for distributed network address translation with security. At Step 284, a request message in a first protocol is received on a second network device requesting one or more locally unique security values for a first network device. At Step 286, one or more locally unique security values are allocated on the second network device. At Step 288, a network address for the first network device is stored with the one or more locally unique security values in a table associated with the second network device. The table is used to maintain a mapping between a network device and a locally unique security value for distributed network address translation with security. At Step 290, the one or more locally unique security values are sent in a response message with the first protocol to the first network device.

In one exemplary preferred embodiment of the present invention, the first network device is a network device (14, 16, 18, 20, 22, 24) on the first computer network 12, the second network device is the router 26, the first protocol is PAP 64, the one or more locally unique security values are SPIs used with IPsec including AH or ESP. The first network device, such as customer computer 14, uses a PAP 64 security request message 67 to request the locally unique SPIs. At Step 284 (FIG. 20), the router 26 receives the PAP 64 security request message 67. The router 26 maintains a table similar to the port-to-internal-network address table 118 illustrated in FIG. 8 except that a SPI value is used in place of a port number. At Step 286, the router 26 allocates one or more locally unique SPIs. At Step 288, a local IP 48 address for the first network device (e.g., 10.0.0.1) is stored with the one or more locally unique SPI values in a table associated with the second network device (e.g., see FIG. 21 below). The table is used to maintain a mapping between a network device and a locally unique SPI for distributed network address translation with security. At Step 290, the one or more locally unique SPIs are sent by the router 26 in a PAP 64 security response message 69 to the first network device 14. However, the present invention is not limited to this exemplary preferred embodiment, and other network devices, protocols, messages, tables and security values could also be used with Method 282.

FIG. 21 is a block diagram illustrating a SPI-to-internal network address table layout 292 used at Step 288 of Method 284 (FIG. 20). FIG. 21 is similar to FIG. 8 except that the locally unique SPI values are 32-bits and the locally unique port values are 16-bits. In FIG. 21, an internal network address column 294 includes internal network addresses for network devices (14, 16, 18, 20, 22, 24) on the first computer network 12. The lowest SPI column 296 includes a lowest SPI value allocated. The number of SPIs column 298 includes a total number of locally unique SPIs allocated to a network device. For example, at row 300, a first network device 14 (FIG. 1) with a local IP 48 address of 10.0.0.1 on the first computer network 12, has been allocated 32 SPIs beginning with a SPI of value "280." At row 302, another network device 18 with a local IP 48 address of 10.0.0.3 on the first computer network 12, has been allocated 16 SPIs beginning with a SPI value of "312." However, the present invention is not limited to this SPI-to-internal network address table layout, and other SPI-to-internal network address table layouts can also be used. A first network device (e.g., 14, FIG. 1) will use locally unique security values (i.e., SPIs) with a second secure protocol (e.g., IPsec) to establish a virtual secure connection (i.e., a SA) to a third external network device (e.g., 39 FIG. 1).

Establishing IPsec security associations using DNAT

As was discussed above, the process of establishing an IPsec SA involves both negotiation and authentication. Authentication is based on a trusted third-party called a Certificate Authority ("CA"). Each endpoint that participates in an IPsec SA generates a public/private encryption key pair, and has its public key "notarized" by the CA. The CA binds an endpoint's IP 48 address to its public key, generates a certificate and returns it to an owner of the key. Thus, IP 48 addresses are used to provide a name space for binding public keys to their owners.

In one exemplary preferred embodiment of the present invention, the router 26 is used to help establish an IPsec SA by acting as a Local Certificate Authority ("LCA"). In one exemplary preferred embodiment of the present invention, the router 26 acts as an LCA and is itself registered with a higher-level CA. The router 26 itself holds a certificate in which a public encryption key for the router 26 is bound to its global IP 48 address (e.g., IP 48 address 28 (FIG. 1)) that is validated by the higher-level CA. The router 26 acts as a LCA to issue security certificates to other network devices (14, 16, 18, 20, 22, 24) on the first computer network 12 to help establish an IPsec SA. However, other network devices may also be used as a LCA besides the Router 26.

FIG. 22 is a flow diagram illustrating a Method 304 for providing a security association using distributed network address translation. At Step 306, one or more locally unique ports are requested with a first message from a first protocol on a first network device from a second network device. The one or more locally unique ports are used for distributed network address translation. At Step 308, one or more locally unique security values are requested with a first message from the first protocol on a first network device from the second network device. The one or more locally unique security values are used with a second secure protocol to establish one or more secure virtual connections between the first network device and a third network device and a second external computer network and for distributed network address translation with security. At Step 310, a security certificate is requested on the first network device from the second network device. The security certificate includes a binding between a public encryption key for the first network device and a combination of a common external network address for the first network device and the one or more locally unique ports allocated by the second network device. The binding comprises a security name space.

In one preferred embodiment of the present invention, the locally unique ports are DNAT ports, the first protocol is the PAP 64, the first message is a PAP 64 security request message 67, and the second secure protocol is IPsec, and the one or more locally unique security values are SPIs. In one exemplary preferred embodiment of the present invention, IKE may be considered a security protocol within the IPsec protocol suite. In another embodiment of the present invention, IKE is not considered a security protocol with the IPsec protocol suite.

IKE is a security protocol that carries a certificate and a SPI value. IKE negotiates a session key that includes a SPI. However, other protocols may also be used to negotiate a session key. The network address is a local IP 48 network address on the first computer network 12 and the second network device is the router 26. However, the present invention is not limited to the ports, protocols, messages, security values, network addresses or network devices discussed, and other ports, protocols, messages, security values, network addresses or network devices could also be used.

In one exemplary preferred embodiment of the present invention, at Step 306, one or more locally unique DNAT ports are requested with a PAP 64 request message 66 on a first network device (e.g., 14) from the router 26 (e.g., with Method 130 of FIG. 9). At Step 308, one or more locally unique SPIs are requested with a PAP 64 security request message 67 from the Router 26. (e.g., with Method 274 of FIG. 19). The one or more locally unique SPIs are used with IPsec to establish one or more SAs between the first network device 12 and a third network device 39 and a second external computer network 30. At Step 310, a security certificate is received on the first network device from the router 26. The security certificate includes a binding between the public encryption key and a combination of a common external IP 48 address for the first network device (e.g.,198.10.20.30) and the one or more locally unique DNAT ports allocated to the first network device. The security certificate is used to establish a SA as is described below.

FIG. 23 is a flow diagram illustrating a Method 312 for distributed network address translation using security. A first message with a first protocol from a first network device is received on a second network device to request one or more locally unique ports. The second network device allocates one or more locally unique ports. At Step 314, the second network device sends the allocated one or more locally unique ports to the first network device using a second message from the first protocol. The one or more locally unique ports are used for distributed network address translation. A first message with a first protocol from a first network device is received on a second network device to request one or more locally unique security values. The second network device allocates one or more locally unique security values. At Step 316, the second network device sends the allocated one or more locally unique security values to the first network device using a second message from the first protocol. The one or more locally unique security values are used with a second secure protocol to establish a secure virtual connection between the first network device and a third network device and a second external computer network and are used for distributed network address translation with security.

A public encryption key and a private encryption key are generated on the first network device. The public encryption key is sent to the second network device from the first network device. The second network device creates a security certificate for the first network device. The security certificate includes a binding between the public encryption key and a combination of an external network address for the first network device and the one or more locally unique security values. In one exemplary preferred embodiment of the present invention, the security certificate is an Internet X.509 security certificate. However, other types of security certificates could also be used and the present invention is not limited to Internet X.509 security certificates. For more information on Internet X.509 security certificates, see RFC-2459, "Internet X.509 Public Key Infrastructure Certificate and CRL Profile," by R. Housley, W. Ford, W. Polk and D. Solo, incorporated herein by reference. For more information on X.509 security certificate management, see RFC-2510 "Internet X.509 Public Key Infrastructure Certificate Management Protocols," by C. Adams and M. Farrell, and RFC-2511 "Internet X.509 Certificate Request Message Format", by M. Myer, C. Adams, D. Solo, and D. Kemp, incorporated herein by reference. At Step 318, the second network device sends the security certificate to the first network device.

In one preferred embodiment of the present invention, the locally unique ports are DNAT ports, the first protocol is the PAP 64, the first message is a PAP 64 security request message 67, the second message a PAP 64 security response message 69 the second secure protocol is IPsec, the one or more locally unique security values are SPIs, the network address used in the CA is an external IP 48 network address of the second network address on the first computer network 12 and the second network device is the router 26. However, the present invention is not limited to the ports, protocols, messages, security values, network addresses or network devices discussed, and other ports, protocols, messages, security values, network addresses or network devices could also be used. After receiving one or more locally unique ports, one or more locally unique security values and the security certificate, a network device can use IPsec with distributed network address translation.

FIG. 24 is a flow diagram illustrating a Method 320 for distributed network address translation using security. At Step 322, a first message in a second secure protocol is received on a first network device on a first network including a request to establish a secure connection to the first network device from a third network device on a second external network. At Step 324, a locally unique security value is selected to use for the secure connection from a stored list of locally unique security values on the first network device. The stored list of locally unique security values was received from a second network device on the first network with a first protocol (e.g., Method 304 of FIG. 22). At Step 326, a second message is sent with the second secure protocol to establish a secure virtual connection to the first network device on the first network from the third network device on the second external network with the selected locally unique security value and a security certificate received by the first network device. (e.g., at Step 310 of Method 304 (FIG. 22)).

In one preferred embodiment of the present invention, the first network device is a network device (14, 16, 18, 20, 22, and 24) on the first computer network 12. The second network device is the router 26, the third network device is an external network device 39, the first protocol is the PAP 64, the second protocol is IPsec, the locally unique security value is a SPI allocated by the router 26 with the PAP 64, and the secure connection is a SA. However, the present invention is not limited to this exemplary preferred embodiment, and other network devices, protocols, security values and secure connections could also be used with Method 320.

In one exemplary preferred embodiment of the present invention, a network device negotiates an incoming IPsec SA with a remote network device on an IP 48 network 30. The SPI selected and assigned to a SA is selected from the one or more of locally unique SPI values allocated by a router 26 with PAP 64 to the network device. In one exemplary preferred embodiment of the present invention, an incoming IPsec SA includes a SA that terminates at the network device for inbound packets (i.e., packets sent from the remote network device to the network device). For outgoing SAs, a SPI is selected by the remote network device and a locally unique SPI is not used by the router 26. In the event of multiple levels of incoming SAs that terminate on a network device, a SPI from the list of locally unique SPI values is allocated only to an outermost SA. A SPI is stored in an IPsec protocol header of an associated IP 48 packet. For an outermost SA, an IPsec protocol header is typically visible for combinations of the IPsec protocol (e.g., AH and ESP) and mode (e.g., transport and tunnel). Thus, the router 26 can access a SPI in an outermost SA associated with any incoming IP 48 packet. After one or more SAs are established between a network device and a remote network device, DNAT with security can be used.

Using IPsec and DNAT

A first network device on a first network exchanges messages with a third network device on a second external network to establish a security association. For example, the first network device exchanges IKE messages to establish a security association with the external third network device. After exchanging some of these messages, a security value (e.g., SPI) allocated with PAP 64 will be used to complete the establishment of a security association between the two network devices.

FIG. 25 is a flow diagram illustrating a Method 328 for distributed network address translation with security. At Step 330, a request in a second secure protocol is sent from a first network device on a first network to a second network device on the first network to complete establishment of security association with a third network device on an external second network The request includes security request information provided to the first network device. In one preferred embodiment of the present invention, the security request information includes a locally unique security value (e.g., SPI) allocated by the second network device with a first protocol (e.g., Method 304 of FIG. 22). The locally unique security value is provided to the first network device by the second network device (e.g., Method 304 of FIG. 22). In another embodiment of the present invention, the security request information includes a security certificate provided by a CA as was discussed above. At Step 332, the request is routed from the second network device to a third network device on a second external network. At Step 334, a response in the second secure protocol is received on the second network device on the first network for the first network device from the third network device on the second external network. The response in the second secure protocol includes security information from the request provided to the first network device. At Step 336, the response is routed from the second network device to the first network device on the first network using a locally unique port from the reply in the second secure protocol. The response completes the establishment of a security association between the first network device and the external third network device using the locally unique security value.

In one preferred embodiment of the present invention, the first network device is a network device (14, 16, 18, 20, 22, and 24) from the first computer network 12, the second network device is the router 26, the first protocol is the PAP 64, the second secure protocol is IPsec, the locally unique security value is a SPI allocated by the router 26 with the PAP 64, the security association is a SA. In this embodiment of the present invention, IPsec includes IKE.

As was discussed above, IKE is a protocol that carries a security certificate and a SPI value. IKE negotiates a session key and a SPI that is associated with a session key. However, other protocols can also be used to negotiate a session key. However, the present invention is not limited to this exemplary preferred embodiment, and other network devices, protocols, security values and secure connections could also be used with Method 328.

IKE can be used in two separate modes called the "Main Mode" and "Aggressive Mode." In the Main Mode an SPI is sent in a first and second message (the first from the intitiator to the responder, the second from the responder to the initiator) and then security certificates are sent in fifth and sixth messages (the fifth from the initiator to the responder and the sixth from the responder to the initiator). The third and fourth messages are used to continue the IKE negotiations. In the Aggressive mode, on the other hand, the SPI is sent in the first and second messages, while the certificates are sent in the third and fourth messages. The request and response messages in Method 328 can be any of the IKE messages used in the Main mode or the Aggressive mode to send a SPI or a security certificate.

In one exemplary preferred embodiment of the present invention, using IPsec over DNAT, the router 26 (FIG. 1) does not look at TCP 58 or UDP 60 port numbers for outbound packets, even though they may be visible using IPsec with AH. For outgoing packets using IPsec, the router 26 removes a virtual tunnel header and forwards the remaining packet over an external network interface 28 to an IP 48 network 30. The virtual tunnel header is an outermost header on the data packet.

For incoming packets using IPsec, the router 26 (FIG. 1) maintains a mapping (FIG. 21) between local IP addresses of network devices (e.g., 14, 16, 18, 20, 22, 24) and SPI values (e.g., Step 288 of Method 282 (FIG. 20). When an AH or ESP IPsec packet arrives on the router 26, the router 26 examines a SPI value in an IPsec packet's outermost header. As was discussed above, the outermost IPsec header is typically visible. The SPI value in the IPsec header is used to determine a local IP 54 address of a destination network device. A tunneling header is constructed and prepended to the packet (e.g., see Tables 3, 5, 8, and 11). The packet is forwarded to a local network device, and the local network device removes the tunnel header and processes the packet. Thus, the router 26 does not modify contents of a received IPsec packet Even though TCP 58/UDP 60 ports are not used with IPsec for address mapping by the router 26, they are still used for DNAT once the IPsec packet is decoded. That is, once IPsec input processing is complete, DNAT as described above is used (e.g., see FIGS. 9 and 10 and FIGS. 13 and 14 and associated text). Port numbers are also required by a remote second network to properly identify connections to network devices on the first network, in the event that more than one device on the first network has established connections with a remote third network device.

The router 26 is used for both DNAT port and SPI allocation and de-allocation. Local network devices can request additional port numbers and additional SPIs that are allocated by the router 26. The router 26 can also render an allocated range of DNAT ports or SPIs invalid If IPsec is implemented as well, additional security certificates may be issued by the LCA with allocation of additional DNAT ports and SPIs to local network devices. In addition, the router 26 maintains a list of all security certificates issued to its local network devices, and ensures that the associated DNAT ports are never de-allocated as long as the security certificates with bindings to these DNAT ports are still valid.

Alternatively, if the router 26 is allowed to de-allocate DNAT ports, it revokes any security certificates with bindings to theses DNAT ports. Security certificate revocation includes notification to remote systems that have active SAs established with the local network devices whose security certificates have been revoked. De-allocation and security certificate revocation may be required, for example, when a local network device has a system crash. In the event of a system crash on the router 26, security certificates are sent again to network devices or invalid security certificates are gracefully revoked.

The methods of authentication are not restricted to the form of the name space for binding of security certificates described above. For example, a combination of the router's 26 global IP 48 address 28 and a user e-mail address (where the user is on a local network device) could also be used for a name space binding for a security certificate. The router 26 acting as an LCA should possess a valid security certificate giving it the right to certify identifiers drawn from a chosen name space.

The methods for preferred embodiments of the present invention presented herein also extends IPsec within the context of Mobile IP, allowing a mobile node to maintain an IPsec-protected connection while it is roaming. For Mobile IP, a mobile node's home agent's global IP address and a mobile nodes local address on its home network can be used for name space binding to create a security certificate to use for IPsec with DNAT. This information is available to a mobile node even while it is roaming (i.e., temporarily residing on a foreign network). A mobile node's home network is managed as a DNAT stub network in which the mobile node resides as a local host when it is not roaming. Using DNAT with Mobile IP is described in co-pending application Ser. No. 09/136,484.

A modified security name space can be used to provide a unique identifier in a security certificate to a network device that lacks a globally unique IP 48 address and is not restricted to a design based upon the router 26 acting as an LCA. It also is possible to define a global CA using a modified name space, and eliminate the need for the LCA, or the router 26 acting as a LCA.

However, such a modified name space is typically insufficient for the DNAT environment, since it does not include a locally unique port number, and hence does not guarantee to a remote system that a local network device has the right to use a specific port number. Also, since stub networks exist, and DNAT includes methods for sharing global IP 48 addresses within stub networks, the LCA approach described herein provides an implementation that would build upon an existing infrastructure, rather than requiring a new infrastructure if a DNAT system is used. Thus, IPsec can be used with DNAT with the router 26 acting as an LCA without requiring a new infrastructure to support a global CA.

Locating internal services on a DNAT network

As was discussed above, an external network device (e.g., 39 of FIG. 1) typically cannot determine what services the internal network devices (e.g., 14, 16, 18, 20, 22 and 24 of FIG. 1) may be capable of providing (e.g., TCP 58, UDP 60, etc.) on the stub network 12. The stub network 12 is hereinafter called an "internal DNAT network 12." When an external application running on an external network device 39 on an external network 30 wishes to contact a service running on an internal network device (e.g., 14), the external application needs to determine appropriate service information. For example, the external application needs to obtain a port or other protocol parameters associated with the available service. There is currently no easy way to determine such information for an internal network device on the internal DNAT network 12.

FIG. 26 is a flow diagram illustrating a Method 340 for identifying internal network services on an internal distributed network address translation network. At Step 342 a digital certificate is created including a network address for an internal network device valid outside an internal distributed network address translation network, a service name, service parameters and an optional public encryption key. In one embodiment of the present invention, the digital certificate is created on an internal distributed address translation network. In another embodiment of the present invention, the digital certificate is not created on the internal distributed network address translation network, but is allocated to the internal distributed network address translation network by a trusted certificate authority outside the distributed network address translation network. At Step 344, the digital certificate is signed with a secure digital signature. The secure digital signature can be independently validated by an external network device on an external network. At Step 346, the digital certificate is published in a location accessible to external network devices on external networks. The digital certificate is used by an external network device to request a desired service from an internal network device on the internal distributed network address translation network.

In one exemplary preferred embodiment of the present invention, the digital certificate created at Step 242 includes following information: 1) (optionally) a public encryption key for the digital certificate which a network device or a service on that network device has the corresponding private encryption key for the digital certificate; 2) a global IP 48 address that is to valid outside the internal DNAT network 12; 3) service parameters used to identify packets sent to a network device or to a service on a network device (e.g., TCP 58 or UDP 60 port numbers or values carried by a special IP 48 header option 224); and 4) a name for a service located on an internal network device. One or more of the service parameters are obtained with the PAP 64 (e.g., locally unique ports) used for DNAT. However, more or fewer types of information can be included in the digital certificate and the present invention is not limited to the digital certificate described.

In one exemplary preferred embodiment of the present invention, at Step 344, the digital certificate is signed with a secure digital signature. In such an embodiment, authentication of the digital certificate is based on a trusted third-party called a Certificate Authority ("CA"). In one exemplary preferred embodiment of the present invention, a CA signs the digital certificate in such a way that an external network device (e.g., 39) can validate it using a certification path it trusts outside of the internal DNAT network 12. For example, a public/private encryption key pair is generated, and the public key is "notarized" by the CA. The public encryption key is used to create a secure digital signature, and the private key is used to validate a digital signature. However, other secure digital signatures can be used and the present invention is not limited to the secure digital signature described.

In one exemplary preferred embodiment of the present invention, at Step 346, the digital certificate is published in a location accessible to external network devices on external networks 30. In order for an external network device to use the certificate, it is published in a way that allows the external network device to retrieve it. For example, it might be stored in a Lightweight Directory Access Protocol ("LDAP") directory under a name representing the service. Other storage options are also possible, such as storing the digital certificates in a public file, in a public database or on a network server are accessible to the external network 30.

In one exemplary preferred embodiment of the present invention, when an external network device desires to use a service on an internal network device, it uses the service's name to locate and retrieve the service's associated digital certificate. However, other methods can also be used to locate and retrieve a digital certificate. The external network device then retrieves the certificate associated with the internal network device and uses the service name to derive a network address of an internal DNAT network 12 on which the service resides.

FIG. 27 is a flow diagram illustrating a Method 348 for requesting services from internal network devices on an internal distributed network address translation network. At Step 350, a signed digital certificate is retrieved on an external network device on an external network for a desired service from an internal distributed network address translation network The digital certificate includes a digital signature, a network address for an internal network device valid outside an internal distributed network address translation network, a service name, service parameters and an optional public encryption key. At Step 352, information is extracted from the signed digital certificate. At Step 354, a service request packet is created with information extracted from the signed digital certificate to request the desired service. At Step 356, a service request packet is sent to an external network address for a router on the internal distributed address translation network to request the desired service from an internal network device on the internal distributed address translation network.

In one exemplary preferred embodiment of the present invention, at Step 350, a signed digital certificate is retrieved on an external network device 39 on an external network 30 from an internal DNAT network 12 for a desired service. At Step 352, information is extracted from the signed digital certificate. In another preferred embodiment of the present invention, the signed digital certificate is verified using the digital signature before extracting information from the signed digital certificate at Step 352. At Step 354, a service request packet (e.g., an IP 48 packet) is created with information extracted from the signed digital certificate to request the desired service (e.g., TCP 58 ports, UDP 60 ports, etc.).

In one exemplary preferred embodiment of the present invention, a network address for an internal network device (e.g., a global IP 48 address) from the digital certificate is placed in a destination address of the service request packet.

Service parameters from the digital certificate packet such as locally unique ports allocated with the PAP 64, (e.g., a destination TCP 58 or UDP 60 port number) are also placed in the service request packet. At Step 356, the service request packet is sent to the router 26 on the internal DNAT network 12 to request the desired service. When the request packet arrives at the router 26, it extracts packet identification information and determines the internal IP 48 address of an internal network device (e.g., 14) on which the service runs. The router 26 then tunnels the service request packet to the internal network device using DNAT as is described above.

Locating internal security services on a DNAT network

In another exemplary preferred embodiment of the present invention, an external network device desires to contact an IPsec service (e.g., Internet Key Exchange protocol ("IKE") service) on an internal network device in order to create an IPSec Security Association ("SA"). Establishing IPSec SA's with DNAT is described above. For example, if the IPsec protocol implementations on the internal network device and the external network device can communicate, they can establish Security Associations with SPIs obtained on the internal network device via the PAP 64. This will allow packets to be securely routed between the two network devices as described above. Furthermore, if an external network device can obtain a locally unique port (e.g., TCP 58 or UDP 60 port) allocated via the PAP 64 associated with the IPsec service running on the internal network device, (e.g., in security certificate), the external network device can use this port information to establish a Security Association between security applications on the two network devices to use IPsec services on the internal DNAT network 12.

FIG. 28 is a flow diagram illustrating a Method 358 for requesting security services from internal network devices on an internal distributed network address translation network. At Step 360, a public key certificate is retrieved on an external network device on an external network for a desired security service from an internal distributed network address translation network. The public key certificate includes a digital signature, a network address for an internal network device valid outside an internal distributed network address translation network, a security service name, security service parameters and a public encryption key. At Step 362, the authenticity of the public key certificate is verified on the external network device using a public encryption key. At Step 364, information is extracted from the public key certificate. At Step 366, a security service request packet is created with information extracted from the public key certificate to request the desired security service. At Step 368, the security service request packet is sent to a router on the internal distributed address translation network to request the desired security service from an internal network device on the internal distributed address translation network.

The security service request packet is received on the router on the internal distributed address translation network. The security service request packet is routed to the appropriate internal network device on the internal network using distributed network address translation. A security association is established between the internal network device and the external network device using information from security service request packet In one exemplary preferred embodiment of the present invention, an external network device (e.g., 39), requests an IPsec service, such as an IKE security service, from an internal network device (e.g., 14). In such an embodiment, a CA creates a public key encryption certificate including a public key. The public key encryption certificate is stored in an external location that is accessible to the external network device. The corresponding private key is held by an IKE application on an internal network device (e.g., 14). The public key encryption certificate also includes a global IP 48 address for the internal network device valid outside the internal DNAT network 12, security service parameters, and a security service name (e.g., IKE). In one preferred embodiment of the present invention, the security service parameters include locally unique ports obtained via the PAP 64 and used for DNAT. In yet another preferred embodiment of the present invention, the security service parameters include identification values obtained via the PAP 64 that can be placed inside an IP 48 header option field 224.

The CA signs the public key encryption certificate in such a way that an external network device can validate it using a certification path it trusts. The router 26 is configured so that security service request packets, such as IPsec packets, received from outside the internal DNAT network 12 including an IP 48 address and information from the public key encryption certificate are routed to an internal network device on which a requested security service identified in the public key encryption certificate resides. Once the security service packet is delivered to the internal network device, it uses the packet identification information to deliver it to the service.

When the external network device desires to use a security service on an internal network, it uses the security service's name (e.g., IKE) to locate and retrieve the security service's associated public key encryption certificate as is described in Method 358. It then uses the security service name and retrieves the public key encryption certificate associated with the internal network device's security application. Alternatively, the external network device might directly retrieve the public key encryption certificate associated with the internal network device's security application using the service name. In either case, the public key encryption certificate is retrieved by a security application running on the external network device.

For example, when an external network device requests an IPsec IKE security service, information (e.g., port information) inside an IKE certificate is used to route IKE requests. The network address from the public key encryption certificate becomes a destination address in a security service request packet (e.g., an IP 48 packet) sent to the router 26 of the internal DNAT network 12. The network address is placed inside a security service request so the router 26 can route it to an appropriate internal network device's IKE application. The service request is then sent to the internal network device using the mechanisms of DNAT. When the security service request arrives at the internal network device, the service parameter information (e.g., destination UDP 60 port number) is used to look up an internal port number used for arriving IKE requests. The security service packet is then routed up the protocol stack 42 to the security application (i.e., the IKE application) receiving on this port number.

Packets sent from an internal network device's security application (e.g., IKE) to the external network device's security application are routed according to the DNAT mechanism. In this way, security protocol messages are exchanged and one or more Security Associations are established between the two security applications. The external network device uses one of these Security Associations to send security service requests to the security service using the methods described for DNAT with IPsec described above.

In particular, the IP 48 address included in the security service's public key encryption certificate is used as a security service request packet destination address and the service parameter information in the service's public key encryption certificate is also placed in the security service request packet so that the router 26 can route it to the appropriate security service on an internal network device.

The methods for preferred embodiments of the present invention allow external network devices on external networks such as the Internet to locate and request services on internal network devices on internal DNAT networks. The methods also allow external network devices to locate and request security services from internal network devices such as IPsec services including IKE and other security services on internal DNAT network. External network devices can request services, and security services, on internal network devices that were previously unknown and unavailable to the external network devices.

In another embodiment of the present invention, the internal network device may support an application that causes the internal device, at the request of the external network device, to initiate the establishment of a SA to the external device. In such an embodiment, the external device desires the secure connection to the internal device, and determines how to contact the internal device using the internal device's certificate, as described above. However, in this embodiment, the external device does not initiate contact with the internal device's IKE implementation. Instead, the external device uses the information in the internal device's certificate to first locate the internal device, and then to invoke an application on the internal device which causes the internal device to contact the IKE implementation on the external device. From this point, the SA establishment follows the procedure described in DNAT with IPsec above.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

We claim:

1. A method for identifying internal network services on an internal distributed network address translation network, comprising the following steps:

creating a digital certificate including a network address for an internal network device valid outside an internal distributed network address translation network, a service name, service parameters and an optional public encryption key;

signing the digital certificate with a secure digital signature, wherein the secure digital signature can be independently validated by an external network device on an external network; and publishing the signed digital certificate in a location accessible to external network devices on external networks, wherein the signed digital certificate is used by an external network device to request a desired service from an internal network device on the internal distributed network address translation network.

2. A computer readable medium having stored therein instructions for causing a central processing unit to execute the method of claim 1.

3. The method of claim 1 wherein the network address in the digital certificate is a global Internet Protocol address.

4. The Method of claim 1 wherein the service parameters in the digital certificate include one or more locally unique ports obtained with a Port Allocation Protocol used for distributed network address translation.

5. The method of claim 1 wherein the service name in the digital certificate is a protocol service name.

6. The method of claim 5 wherein the protocol service name is any of File Transfer Protocol, Telnet, Hyper Text Transfer Protocol, or Internet Key Exchange protocol.

7. The method of claim 1 wherein the step of signing the digital certificate with a secure digital signature includes signing the digital certificate with a public/private key encryption method.

8. The method of claim 1 wherein the step of publishing the signed digital certificate in a location accessible to external network devices on external networks includes publishing the digital certificate in any of a Lightweight Directory Access Protocol directory, in a public file, in a public database, or on a network server on the internal distributed network address translation network.

9. The method of claim 1 wherein the step of publishing the signed digital certificate includes publishing digital certificates for Internet Protocol Security Services.

10. The method of claim 1 wherein the internal network is a local area network and the external network is the Internet.

11. The method of claim 1 wherein the signed digital certificate is a public key encryption digital certificate.

12. A method for requesting services from internal network devices on an internal distributed network address translation network, comprising the following steps:

retrieving a signed digital certificate on an external network device on an external network for a desired service from an internal distributed network address translation network, wherein the digital certificate includes a digital signature, a network address for an internal network device valid outside the internal distributed network address translation network, a service name, service parameters and an optional public encryption key;

extracting information from the signed digital certificate;

creating a service request packet with information extracted from the signed digital certificate to request the desired service; and sending the service request packet to a router on the internal distributed address translation network to request the desired service from an internal network device on the internal distributed network address translation network.

13. A computer readable medium having stored therein instructions for causing a central processing unit to execute the method of claim 12.

14. The method of claim 12 further comprising:

receiving the service request packet on the router on the internal distributed address translation network; and routing the service request packet to the appropriate internal network device on the internal network using distributed network address translation.

15. The method of claim 12 further comprising verifying the signed digital certificate using the digital signature before using information from the signed digital certificate.

16. The method of claim 12 wherein the service request packet is an Internet Protocol packet.

17. The method of claim 12 wherein the step of creating a service request packet includes adding the network address from the signed digital certificate in a destination field in the request packet and adding the service parameters from the signed digital certificate in one or more parameter fields in the service request packet.

18. The method of claim 12 wherein the step of creating a service request packet includes creating a service request packet to request a security service.

19. The method of claim 18 wherein the security service is an Internet Protocol security service.

20. The method of claim 19 wherein the Internet Protocol security service is an Internet Key Exchange protocol service.

21. A method for requesting security services from internal network devices on an internal distributed network address translation network, comprising the following steps:

retrieving a public key certificate on an external network device on an external network for a desired security service from an internal distributed network address translation network, wherein the public key certificate includes a digital signature, a network address for an internal network device valid outside an internal distributed network address translation network, a service name, service parameters and an optional public encryption key;

verifying the authenticity of the public key certificate on the external network device using a private encryption key; extracting information from the public key certificate;

creating a security service request packet with information extracted from the public key certificate to request the desired security service; and sending the security service request packet to a router on the internal distributed address translation network to request the desired security service from an internal network device on the internal distributed network translation network.

22. A computer readable medium having stored therein instructions for causing a central processing unit to execute the method of claim 21.

23. The method of claim 21 wherein the desired security service is an Internet Protocol security service.

24. The method of claim 23 wherein the Internet Protocol security service is an Internet Key Exchange protocol service.

25. The method of claim 21 further comprising:

receiving the security service request packet on the router on the internal distributed address translation network;

routing the security service request packet to the appropriate internal network device on the internal distributed network address translation network; and establishing a security association between the internal network device and the external network device using information from security service request packet.

26. The method of claim 21 wherein the security service request packet is an Internet protocol security packet.

27. The method of claim 21 wherein the service parameters include one or more locally unique ports obtained with a Port Allocation Protocol used for distributed network address translation.

28. The method of claim 21 wherein a Security Association is established using security values allocated by a Port Allocation Protocol used for distributed network address translation.

29. The method of claim 21 wherein the security service request packet is an Internet Protocol security packet.

* * * * *